(12) United States Patent
Otsuka et al.

(10) Patent No.: US 12,407,958 B2
(45) Date of Patent: Sep. 2, 2025

(54) IMAGING DEVICE

(71) Applicant: SONY SEMICONDUCTOR SOLUTIONS CORPORATION, Kanagawa (JP)

(72) Inventors: Yusuke Otsuka, Kanagawa (JP); Kenichi Okumura, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 89 days.

(21) Appl. No.: 18/550,402

(22) PCT Filed: Feb. 1, 2022

(86) PCT No.: PCT/JP2022/003761
§ 371 (c)(1),
(2) Date: Sep. 13, 2023

(87) PCT Pub. No.: WO2022/201874
PCT Pub. Date: Sep. 29, 2022

(65) Prior Publication Data
US 2024/0163585 A1    May 16, 2024

(30) Foreign Application Priority Data
Mar. 22, 2021   (JP) ................ 2021-047710

(51) Int. Cl.
*H04N 25/77*   (2023.01)
*H04N 25/57*   (2023.01)
(Continued)

(52) U.S. Cl.
CPC ............................ *H04N 25/77* (2023.01)

(58) Field of Classification Search
CPC ...... H04N 25/57; H04N 25/59; H04N 25/621; H04N 25/771
See application file for complete search history.

(56) References Cited

U.S. PATENT DOCUMENTS

| | | | |
|---|---|---|---|
| 9,876,046 B2 * | 1/2018 | Tomekawa | H10F 39/18 |
| 11,595,596 B2 * | 2/2023 | Maruyama | H10F 39/1847 |
| 2020/0053309 A1 * | 2/2020 | Takatsuka | H04N 25/78 |

FOREIGN PATENT DOCUMENTS

| | | |
|---|---|---|
| JP | 2003-134396 A | 5/2003 |
| JP | 2018-186398 A | 11/2018 |
| WO | 2019/155841 A1 | 8/2019 |

OTHER PUBLICATIONS

International Search Report and Written Opinion of PCT Application No. PCT/JP2022/003761, issued on Apr. 19, 2022, 09 pages of ISRWO.

* cited by examiner

*Primary Examiner* — Marly S Camargo
(74) *Attorney, Agent, or Firm* — CHIP LAW GROUP

(57) ABSTRACT

The present disclosure provides an imaging device capable of expanding a dynamic range. An imaging device according to one embodiment of the present disclosure includes: a photoelectric conversion element provided in each of a plurality of pixels; a first charge accumulation section connected to the photoelectric conversion element; a second charge accumulation section connected in parallel with the first charge accumulation section; a reset transistor that resets a potential of the second charge accumulation section; a transfer transistor disposed between the first charge accumulation section and the second charge accumulation section; a third charge accumulation section connected in parallel with the first charge accumulation section; and a first changeover switch that is disposed between the first charge accumulation section and the third charge accumulation section and switches whether or not to connect the third charge accumulation section to the photoelectric conversion element.

14 Claims, 30 Drawing Sheets

(51) Int. Cl.
*H04N 25/59* (2023.01)
*H04N 25/621* (2023.01)
*H04N 25/771* (2023.01)

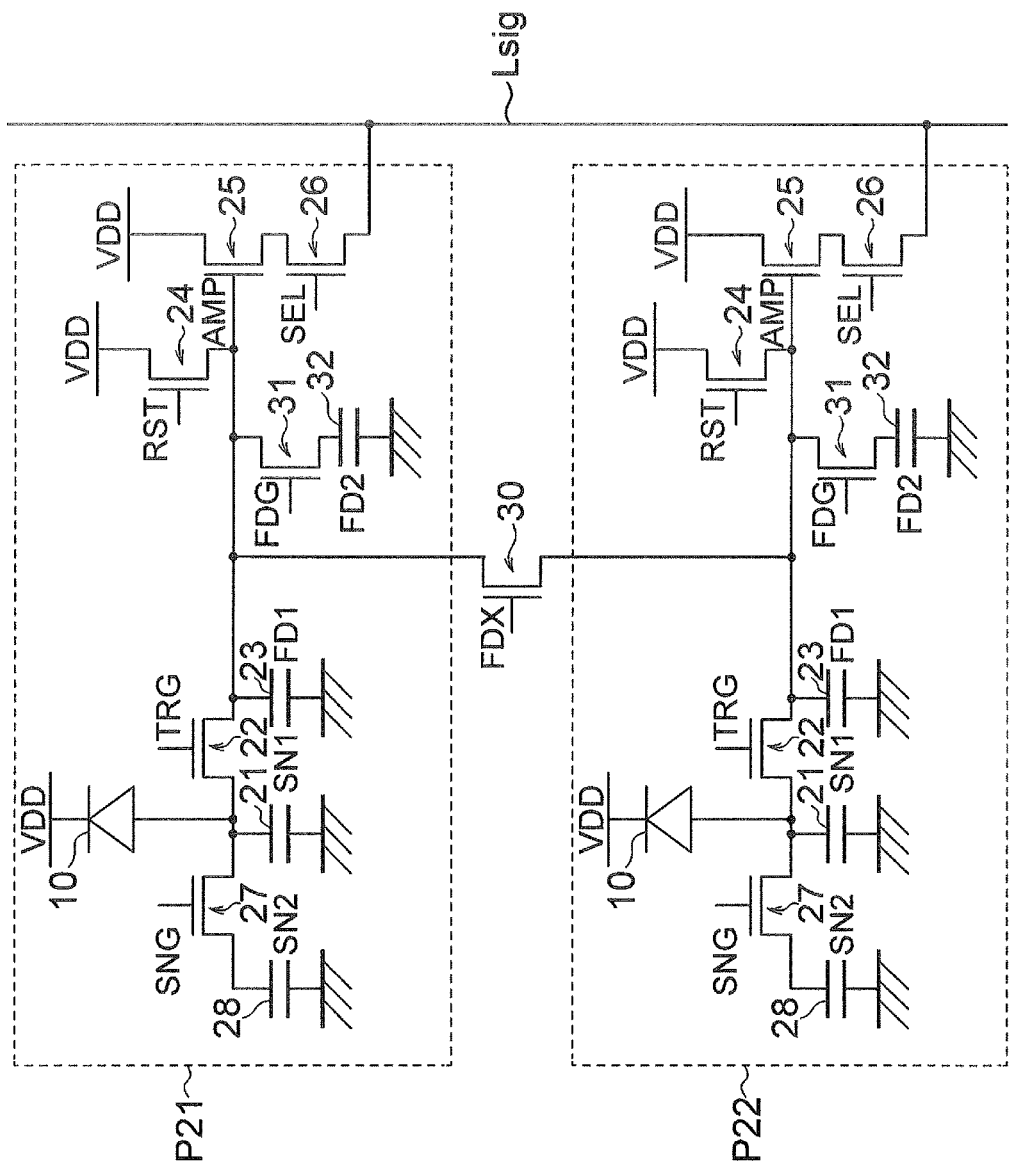

IMAGING DEVICE

CROSS REFERENCE TO RELATED APPLICATIONS

This application is a U.S. National Phase of International Patent Application No. PCT/JP2022/003761 filed on Feb. 1, 2022, which claims priority benefit of Japanese Patent Application No. JP 2021-047710 filed in the Japan Patent Office on Mar. 22, 2021. Each of the above-referenced applications is hereby incorporated herein by reference in its entirety.

TECHNICAL FIELD

The present disclosure relates to an imaging device.

BACKGROUND ART

An imaging device generally includes a photoelectric conversion element and a readout integrated circuit (ROIC) that reads out charges from the photoelectric conversion element. The readout integrated circuit is provided with a charge accumulation section that accumulates the charge read out from the photoelectric conversion element. The conversion efficiency indicating the voltage of the output signal per one electron depends on the capacitance of the charge accumulation section.

CITATION LIST

Patent Document

Patent Document 1: WO 2019/155841

SUMMARY OF THE INVENTION

Problems to be Solved by the Invention

In the imaging device, since the capacitance of the charge accumulation section is fixed, the conversion efficiency is also fixed. In this case, for example, the conversion efficiency cannot be changed according to the charge amount from the photoelectric conversion element, and thus it is difficult to expand the dynamic range.

The present disclosure provides an imaging device capable of expanding a dynamic range.

Solutions to Problems

An imaging device according to one embodiment of the present disclosure includes: a photoelectric conversion element provided in each of a plurality of pixels; a first charge accumulation section connected to the photoelectric conversion element; a second charge accumulation section connected in parallel with the first charge accumulation section; a reset transistor that resets a potential of the second charge accumulation section; a transfer transistor disposed between the first charge accumulation section and the second charge accumulation section; a third charge accumulation section connected in parallel with the first charge accumulation section; and a first changeover switch that is disposed between the first charge accumulation section and the third charge accumulation section and switches whether or not to connect the third charge accumulation section to the photoelectric conversion element.

Furthermore, the first changeover switch may switch whether or not to connect the third charge accumulation section to the photoelectric conversion element according to a light amount of light incident on the photoelectric conversion element.

Furthermore, the first changeover switch may be in an off state in a case where the light amount is smaller than a reference value, and in an on state in a case where the light amount is larger than the reference value.

Furthermore, a second changeover switch connected to each of the reset transistor and the second charge accumulation section; and a fourth charge accumulation section disposed between the reset transistor and the second changeover switch or connected in parallel with the second charge accumulation section via the second changeover switch may be further provided.

Furthermore, the second changeover switch may switch whether or not to connect the fourth charge accumulation section to the second charge accumulation section in synchronization with the first changeover switch.

Furthermore, an addition value of capacitances of the first charge accumulation section and the third charge accumulation section may be equal to an addition value of capacitances of the second charge accumulation section and the fourth charge accumulation section.

Furthermore, the reset transistor, the transfer transistor, the first changeover switch, and the second changeover switch may be P-channel MOS transistors.

Furthermore, a selection transistor that switches whether or not to output a pixel signal corresponding to an amount of charge accumulated in the second charge accumulation section may be further provided, and the selection transistor may be turned on again after the first changeover switch is maintained in an off state and the first changeover switch may be subsequently switched from the off state to an on state.

Furthermore, a capacitance of the third charge accumulation section may be larger than a capacitance of the first charge accumulation section.

Furthermore, among the plurality of pixels, a pixel in which the third charge accumulation section is connected to the photoelectric conversion element by the first changeover switch and a pixel in which the third charge accumulation section is not connected to the photoelectric conversion element by the first changeover switch may be mixed.

Furthermore, an overflow gate transistor that discharges charge accumulated in the third charge accumulation section may be further provided.

Furthermore, the reset transistor, the transfer transistor, and the first changeover switch may be P-channel MOS transistors.

Furthermore, a third changeover switch that switches whether or not to connect the second charge accumulation sections respectively provided in adjacent pixels adjacent to each other among the plurality of pixels may be further provided.

Furthermore, among the plurality of pixels, the third changeover switch may be always in an on state in a case where the adjacent pixels are added, and the third changeover switch may be always in an off state in a case where the adjacent pixels are not added.

BRIEF DESCRIPTION OF DRAWINGS

FIG. 17B is a circuit diagram illustrating the configuration of the pixel according to the sixth modification.

MODE FOR CARRYING OUT THE INVENTION

First Embodiment

Figure 1:
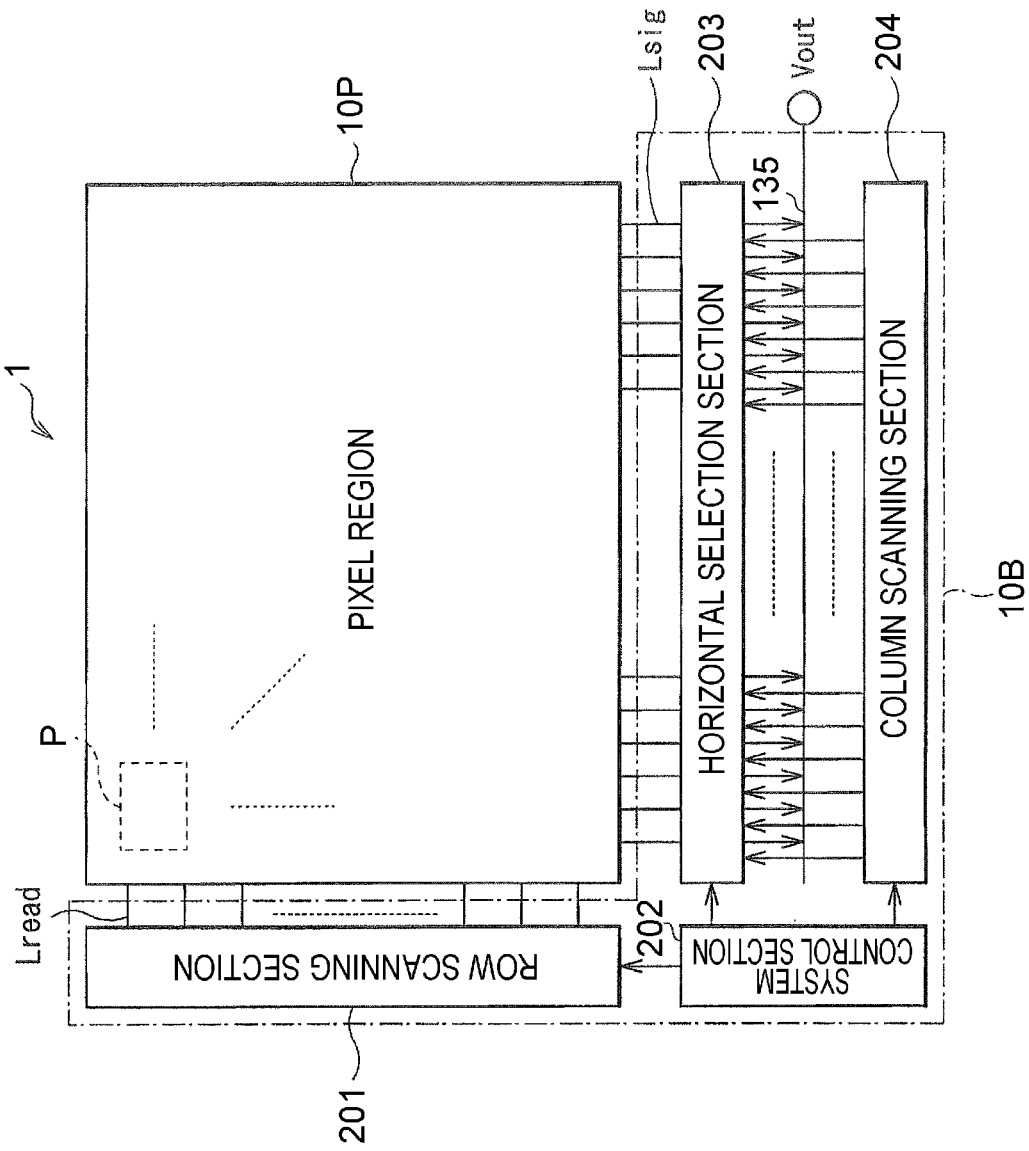
FIG. 1 is a block diagram illustrating an example of a configuration of an imaging device according to a first embodiment.

FIG. 1 is a block diagram illustrating an example of a configuration of an imaging device according to a first embodiment. An imaging device 1 illustrated in FIG. 1 is, for example, an infrared image sensor, and has sensitivity also to light having a wavelength of 800 nm or more, for example. In the imaging device 1, for example, a rectangular pixel region 10P and an extra-pixel region 10B outside the pixel region 10P are provided. In the extra-pixel region 10B, a peripheral circuit for driving the pixel region 10P is provided.

In the pixel region 10P of the imaging device 1, a plurality of pixels P is two-dimensionally disposed. The peripheral circuit provided in the extra-pixel region 10B includes, for example, a row scanning section 201, a horizontal selection section 203, a column scanning section 204, and a system control section 202.

The row scanning section 201 includes a shift register, an address decoder, and the like, and is a pixel drive section that drives each pixel P, for example, in units of rows. The pixel signal output from each pixel P of the pixel row selectively scanned by the row scanning section 201 is supplied to the horizontal selection section 203 through each of vertical signal lines Lsig. The horizontal selection section 203 includes an amplifier, a horizontal selection switch, and the like provided for each vertical signal line Lsig.

The column scanning section 204 includes a shift register, an address decoder, and the like, and scans and concurrently drives each horizontal selection switch of the horizontal selection section 203 in sequence. By the selective scanning by the column scanning section 204, the pixel signal of each pixel transmitted through each of the vertical signal lines Lsig is sequentially output to the horizontal signal line. Thereafter, the pixel signal is input to a signal processing section (not illustrated) or the like through the horizontal signal line.

The system control section 202 receives an externally supplied clock, data indicating an operation mode and the like, and further outputs data such as internal information of the imaging device 1. The system control section 202 further includes a timing generator that generates various timing signals, and performs drive control of the row scanning section 201, the horizontal selection section 203, the column scanning section 204, and the like on the basis of the various timing signals generated by the timing generator.

Figure 2:
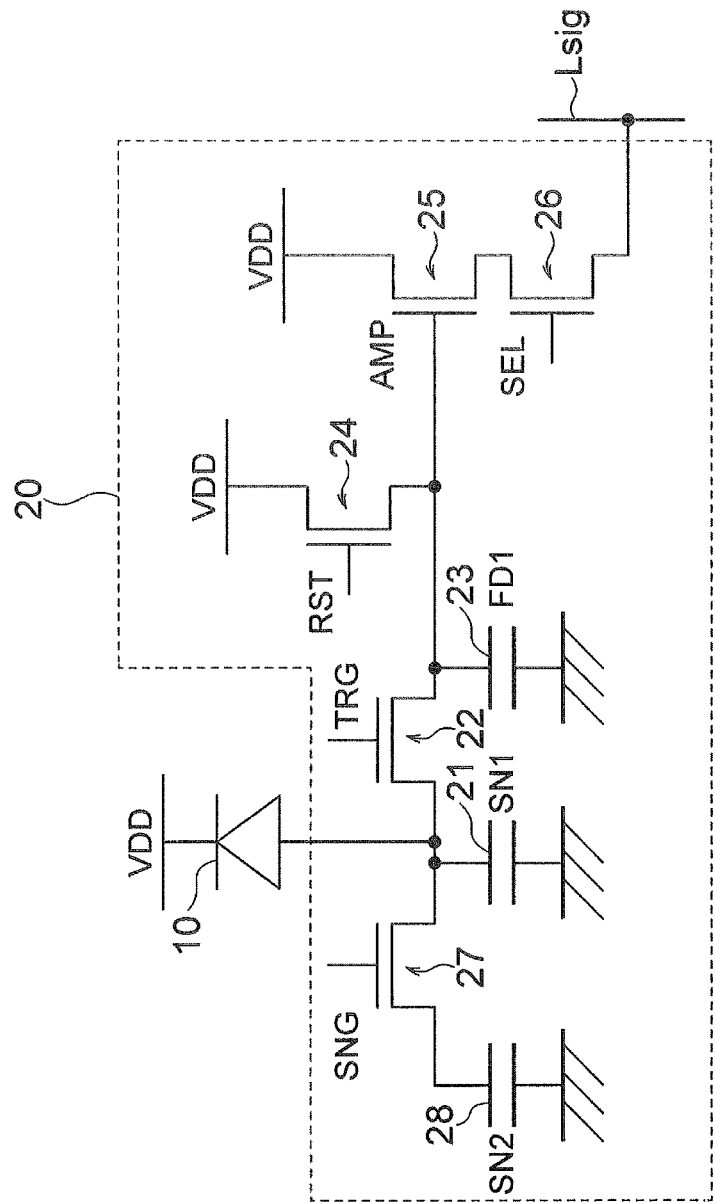
FIG. 2 is a circuit diagram illustrating a configuration of a pixel according to the first embodiment.

FIG. 2 is a circuit diagram illustrating a configuration of the pixel P. The pixel P includes a photoelectric conversion element 10 and a pixel circuit 20. The photoelectric conversion element 10 is disposed on one semiconductor substrate, and the pixel circuit 20 is disposed on another semiconductor substrate stacked under the one semiconductor substrate.

The photoelectric conversion element 10 is, for example, a photodiode that photoelectrically converts incident light having a wavelength in an infrared region. In the photoelectric conversion element 10, a photoelectric conversion film (not illustrated) is provided between an anode electrode and a cathode electrode. The photoelectric conversion film includes, for example, a compound semiconductor material such as a group III-V semiconductor, and photoelectrically converts light having a wavelength in a visible region to a short infrared region.

As the compound semiconductor material constituting the photoelectric conversion element 10, for example, InGaAs (indium gallium arsenide), InAsSb (indium arsenide antimony), GaAsSb (gallium arsenide antimony), InAs (indium arsenide), InSb (indium antimony), HgCdTe (mercury cadmium telluride), and the like can be used. Furthermore, the photoelectric conversion film may include Ge (germanium). Furthermore, the photoelectric conversion film may include a semiconductor material having a Type II structure.

The pixel circuit 20 is an example of a readout integrated circuit that reads out the charge of the photoelectric conversion element 10. Specifically, the pixel circuit 20 includes a first charge accumulation section (SN1) 21, a transfer transistor (TRG) 22, a second charge accumulation section (FD1) 23, a reset transistor (RST) 24, an amplification transistor (AMP) 25, a selection transistor (SEL) 26, a changeover switch 27, and a third charge accumulation section 28.

The first charge accumulation section 21 includes a capacitor that temporarily holds the charge photoelectrically converted by the photoelectric conversion element 10. One end of the first charge accumulation section 21 is connected to the anode electrode of the photoelectric conversion element 10 and the source of the transfer transistor 22. The other end of the first charge accumulation section 21 is grounded.

The drain of the transfer transistor 22 is connected to the second charge accumulation section 23. That is, the transfer transistor 22 is disposed between the first charge accumulation section 21 and the second charge accumulation section 23. The transfer transistor 22 is turned on and off on the basis of a transfer signal input from the row scanning section 201 to the gate. When the transfer transistor 22 is turned on, the charge accumulated in the first charge accumulation section 21 is transferred to the second charge accumulation section 23 via the transfer transistor 22.

The second charge accumulation section 23 is a floating diffusion that accumulates the charge transferred from the first charge accumulation section 21. One end of the second charge accumulation section 23 is connected to the source of the reset transistor 24 and the gate of the amplification transistor 25 together with the drain of the transfer transistor. The other end of the second charge accumulation section 23 is grounded.

The drain of the reset transistor 24 is connected to a power source VDD. The reset transistor 24 is turned on and off on the basis of a reset signal input from the row scanning section 201 to the gate. When the reset transistor 24 is turned on, a reset potential VRST is applied to the second charge accumulation section 23. The reset potential VRST brings the potential of the second charge accumulation section 23 into an initial state (reset state).

In the amplification transistor 25, the gate is connected to the second charge accumulation section 23, the drain is connected to the power source VDD, and the source is connected to the drain of the selection transistor 26. The amplification transistor 25 configures a source follower circuit with a load metal oxide semiconductor (MOS) as a constant current source connected via a vertical signal line Lsig. The amplification transistor 25 generates a pixel signal corresponding to the charge amount accumulated in the second charge accumulation section 23.

The source of the selection transistor 26 is connected to the vertical signal line Lsig. The selection transistor 26 is turned on and off on the basis of a selection signal input from the row scanning section 201 to the gate. When the selection transistor 26 is turned on, the pixel signal generated by the amplification transistor 25 is output to the horizontal selection section 203 via the vertical signal line Lsig.

The changeover switch 27 corresponds to a first changeover switch and includes an N-channel MOS transistor. In the changeover switch 27, a drain is connected to one end of the first charge accumulation section 21, and a source is connected to one end of the third charge accumulation section 28. That is, the changeover switch 27 is disposed between the first charge accumulation section 21 and the third charge accumulation section 28. The changeover switch 27 is turned on and off on the basis of a control signal input from the row scanning section 201 to the gate. When the changeover switch 27 is turned on, the charge photoelectrically converted by the photoelectric conversion element 10 is accumulated in the third charge accumulation section 28 via the changeover switch 27.

The third charge accumulation section 28 includes a capacitor that temporarily holds the charge photoelectrically converted by the photoelectric conversion element 10. The other end of the third charge accumulation section 28 is grounded.

In the pixel P configured as described above, the conversion efficiency changes depending on whether or not the changeover switch 27 connects the third charge accumulation section 28 to the photoelectric conversion element 10. When the changeover switch 27 is turned on, the conversion efficiency decreases. Conversely, when the changeover switch 27 is turned off, the conversion efficiency increases.

The following Formula (1) shows conversion efficiency (Low) when the changeover switch 27 is turned on and conversion efficiency (Hi) when the changeover switch 27 is turned off. In Formula (1), q represents the amount of charge of the photoelectric conversion element 10. Furthermore, $C_{sn1}$, $C_{sn2}$, and $C_{fd1}$ are capacitances of the first charge accumulation section 21, the third charge accumulation section 28, and the second charge accumulation section 23, respectively.

[Mathematical Formula 1]

$$\text{Conversion efficiency (Hi): } \frac{q}{(C_{fd1} + C_{sn1})} \quad (1)$$

$$\text{Conversion efficiency (Low): } \frac{q}{(C_{fd1} + C_{sn1} + C_{sn2})}$$

According to Formula (1), the conversion efficiency (Low) depends on the capacitance of each of the first charge accumulation section 21, the second charge accumulation section 23, and the third charge accumulation section 28. At this time, as the capacitance $C_{sn2}$ of the third charge accumulation section 28 increases, the saturation signal amount also increases. Therefore, the capacitance $C_{sn2}$ of the third charge accumulation section 28 is desirably larger than the capacitance $C_{sn1}$ of the first charge accumulation section 21.

Furthermore, readout noise depends on the balance between the addition value of the capacitance $C_{sn1}$ and the capacitance $C_{sn2}$ and the capacitance $C_{fd1}$. For example, it is desirable that the addition value described above be equal to the capacitance $C_{fd1}$. Note that the readout noise is, for example, input-converted random noise (RN) in double delta sampling (DDS) driving, in other words, kT/C noise. Furthermore, as the capacitance $C_{fd1}$ increases, the amount of charge that can be accumulated in the second charge accumulation section 23 increases.

With the configuration of the pixel circuit 20 described above, at low illuminance when the amount of light incident on the photoelectric conversion element 10 is smaller than the reference value, readout noise can be reduced by turning off the changeover switch 27. On the other hand, at high illuminance when the amount of light incident on the photoelectric conversion element 10 is higher than the reference value, the saturation signal amount can be increased by turning on the changeover switch 27.

Hereinafter, a readout operation of the pixel circuit 20 will be described.

Figure 3:
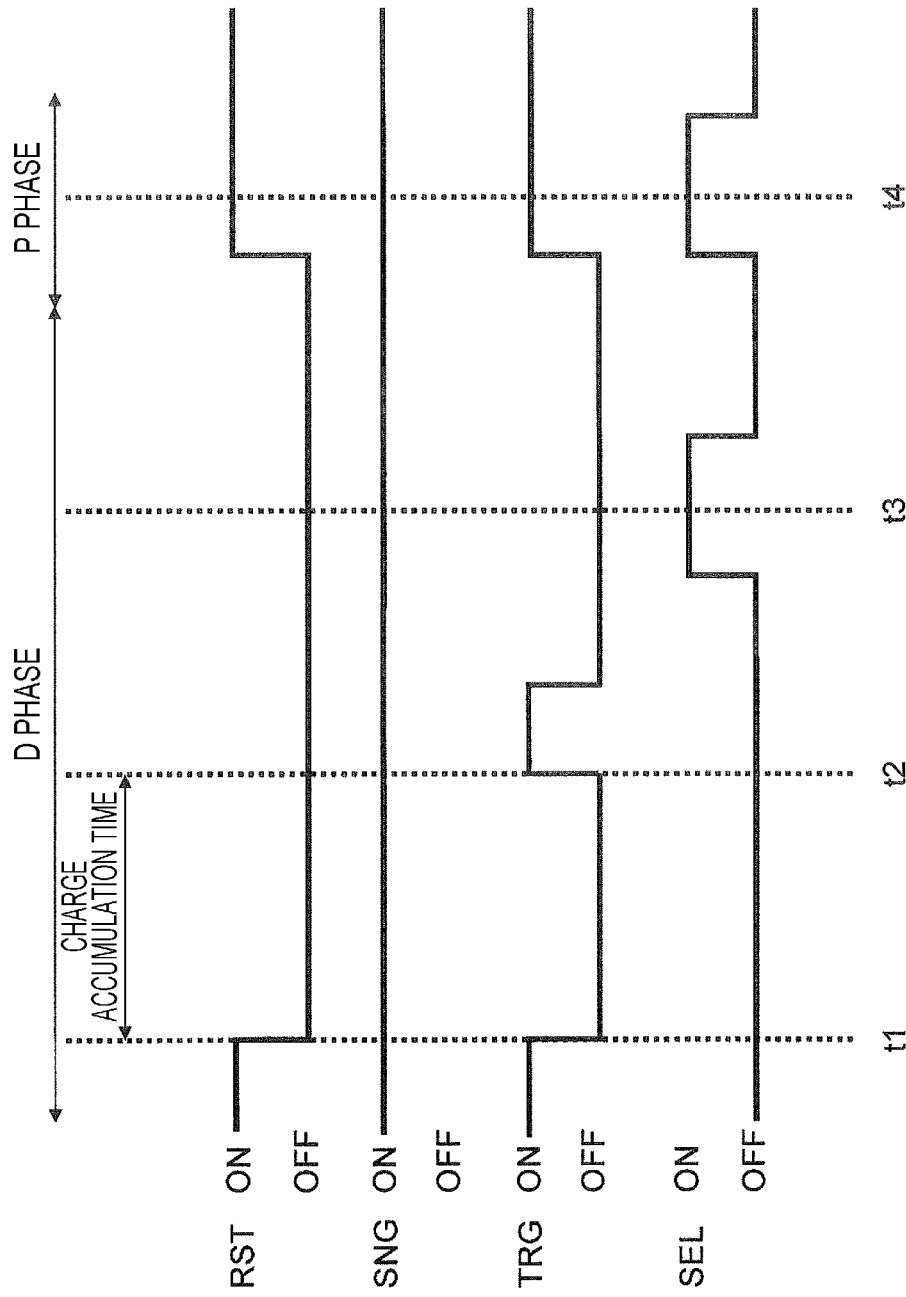
FIG. 3 is a timing chart illustrating an example of a readout operation of a pixel circuit according to the first embodiment.

FIG. 3 is a timing chart illustrating an example of the readout operation of the pixel circuit 20. In this readout operation, the conversion efficiency (Low) is set. Therefore, the changeover switch 27 (SNG) is always in an on state regardless of a data phase (D phase) and a reset phase (P phase).

In the timing chart illustrated in FIG. 3, first, in the charge accumulation time from time t1 to time t2, the reset transistor 24 (RST), the transfer transistor 22 (TRG), and the selection transistor 26 (SEL) are in an off state. Therefore, the charge photoelectrically converted by the photoelectric conversion element 10 is accumulated in the first charge accumulation section 21 and the third charge accumulation section 28.

Next, within the time from time t2 to time t3, the transfer transistor 22 is switched from the off state to the on state. As a result, the charges accumulated in the first charge accumulation section 21 and the third charge accumulation section 28 are transferred to the second charge accumulation section 23 and amplified as a pixel signal by the amplification transistor 25. Subsequently, when the transfer transistor 22 returns to the off state, the selection transistor 26 is turned on. As a result, the pixel signal is output to the vertical signal line Lsig.

Next, the selection transistor 26 is turned off within the time from time t3 to time t4. Subsequently, the reset transistor 24, the transfer transistor 22, and the selection transistor 26 are simultaneously switched from the off state to the on state. As a result, the charge remaining in the second charge accumulation section 23 is discharged via the reset transistor 24, so that the second charge accumulation section 23 is reset to the initial state. Thereafter, the above operation is repeated again.

Note that, in the readout operation set to the conversion efficiency (Hi), the changeover switch 27 (SNG) is always in the off state regardless of the data phase (D phase) and the reset phase (P phase). Furthermore, by adjusting the timing of the pulse of the signal input to the gate of each transistor, the pixel region 10P can be driven by a global shutter method in which all the pixels P accumulate (expose) charges at the same timing, or can be driven by a rolling shutter method in which each pixel P accumulates charges at different timings.

Figure 4:
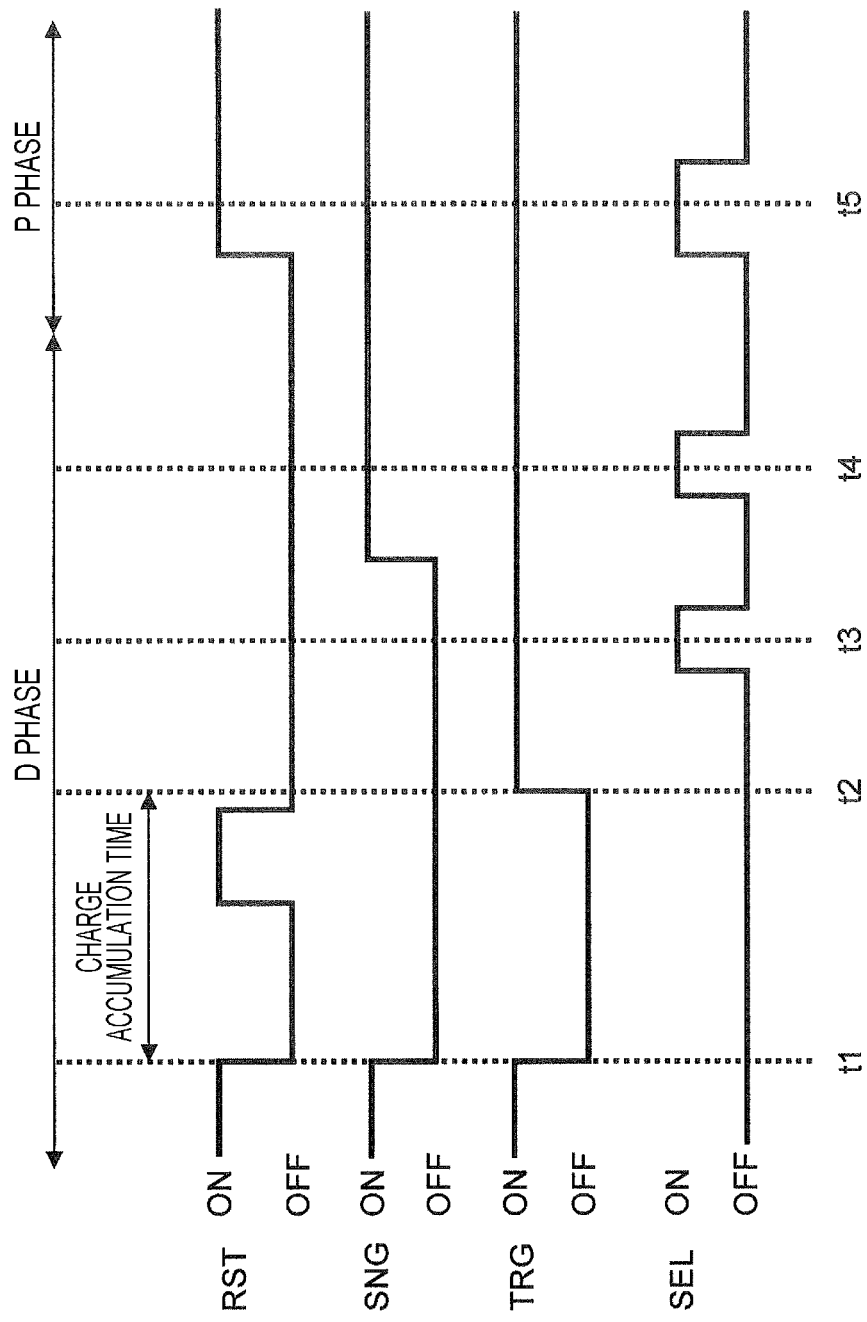
FIG. 4 is a timing chart illustrating another example of the readout operation of the pixel circuit according to the first embodiment.

FIG. 4 is a timing chart illustrating another example of the readout operation of the pixel circuit 20. Here, differences from the timing chart illustrated in FIG. 3 will be described. In the timing chart illustrated in FIG. 3, the charge set to the conversion efficiency (Hi) and the charge set to the conversion efficiency (Low) are read out at different times.

On the other hand, in the timing chart illustrated in FIG. 4, within the time from time t2 to time t3 after the charge accumulation time (time from time t1 to time t2), the changeover switch 27 is maintained in the off state and the selection transistor 26 is turned on, so that the charge set to the conversion efficiency (Hi) is read out.

Next, within the time from time t3 to time t4, since the selection transistor 26 is turned on again after the changeover switch 27 is switched from the off state to the on state, the charge set to the conversion efficiency (Low) is read out.

Thereafter, within the time from time t4 to time t5, the charge remaining in the second charge accumulation section 23 is discharged via the reset transistor 24, and thus the second charge accumulation section 23 is reset to the initial state.

According to the timing chart illustrated in FIG. 4, the charge set to the conversion efficiency (Hi) and the charge set to the conversion efficiency (Low) can be simultaneously read out by one exposure. Also, in this readout operation, the charge having overflowed from the first charge accumulation section 21 via the changeover switch 27 is accumulated in the third charge accumulation section 28, whereby the dynamic range can be expanded by one exposure.

According to the present embodiment described above, the pixel circuit 20 is provided with the changeover switch 27 and the third charge accumulation section 28. Therefore, by switching on and off the changeover switch 27 according to the illuminance condition, the capacitance of the entire charge accumulation section in the pixel circuit 20 changes. With this change, the conversion efficiency also changes, and thus the dynamic range can be expanded.

Note that, in the pixel region 10P, the illuminance condition may be different for each pixel P in some cases. Therefore, in the pixel region 10P, a pixel P in which the changeover switch 27 is turned on (set to the conversion efficiency (Low)) and a pixel P in which the changeover switch 27 is turned off (set to the conversion efficiency (Hi)) may be mixed. In this case, the conversion rate can be optimized for each pixel P.

First Modification

Some modifications of the first embodiment will be described below. Components similar to those of the first embodiment described above are denoted by the same reference numerals, and detailed description thereof will be omitted.

Figure 5:
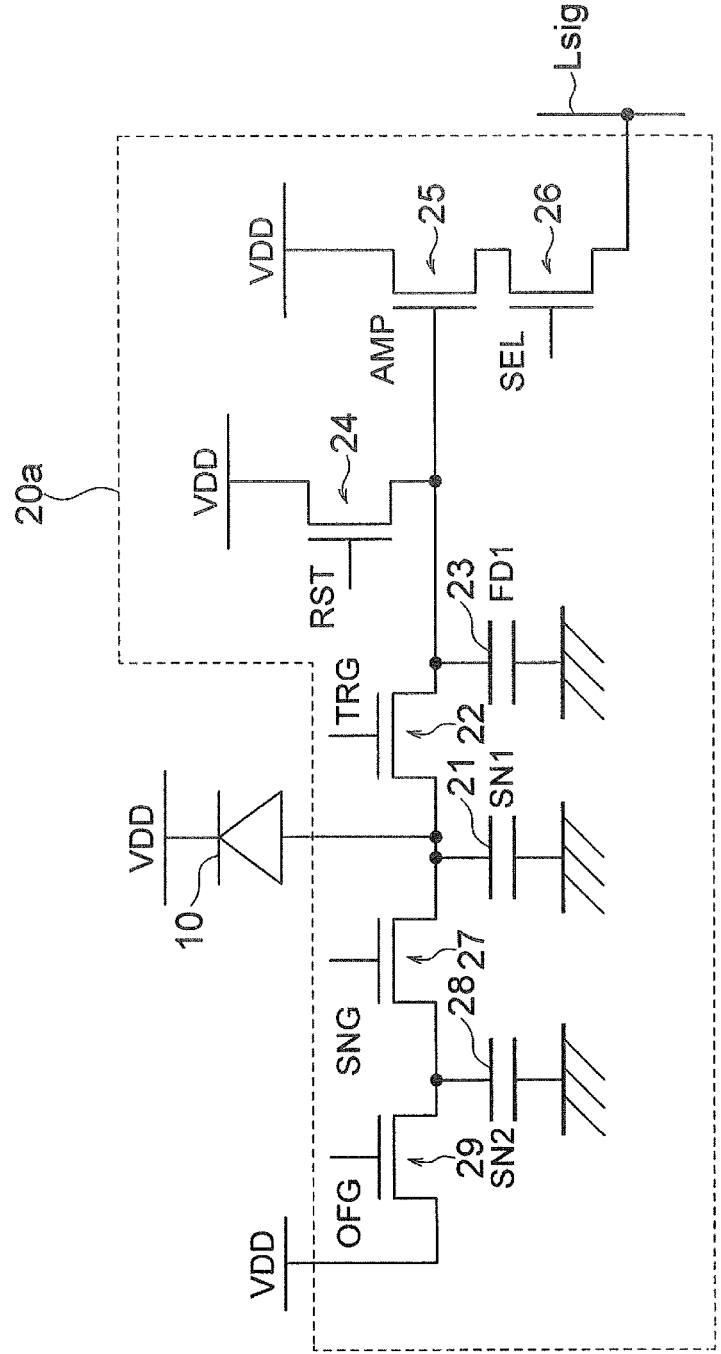
FIG. 5 is a circuit diagram illustrating a configuration of a pixel according to a first modification.

FIG. 5 is a circuit diagram illustrating a configuration of a pixel according to a first modification. Furthermore, FIG. 6 is a timing chart illustrating an example of the readout operation of the pixel circuit according to the first modification.

As illustrated in FIG. 5, a pixel circuit 20a according to the present modification further includes an overflow gate (OFG) transistor 29 in addition to the components of the pixel circuit 20 described above. The overflow gate transistor 29 includes an N-channel MOS transistor. In the overflow gate transistor 29, the drain is connected to the source of the changeover switch 27 and one end of the third charge accumulation section 28, and the source is connected to the power source VDD. The overflow gate transistor 29 is turned on and off on the basis of a discharge signal input from the row scanning section 201 to the gate.

Figure 6:
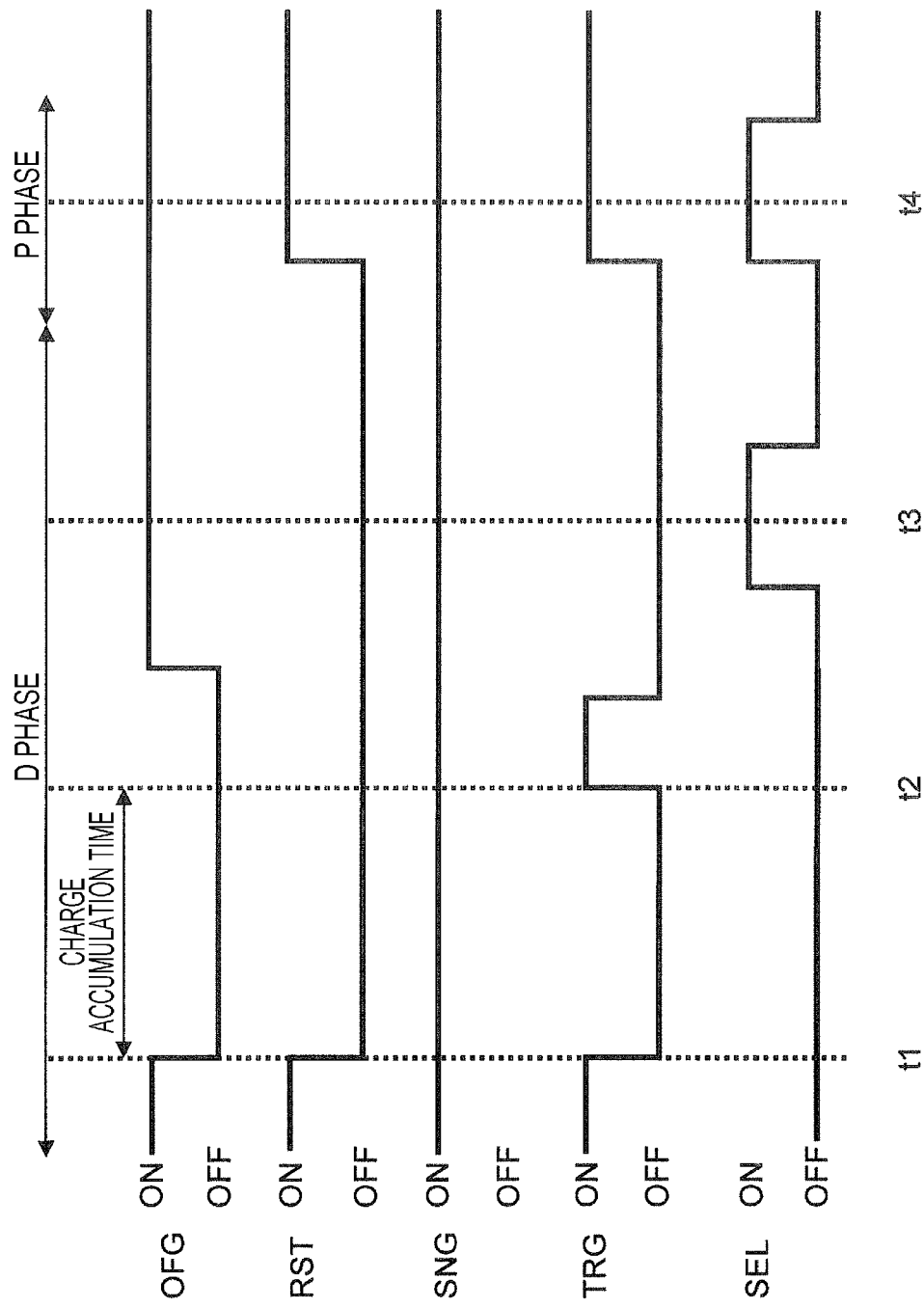
FIG. 6 is a timing chart illustrating an example of a readout operation of a pixel circuit according to the first modification.

In the present modification, as illustrated in FIG. 6, the overflow gate transistor 29 is switched from the off state to the on state until the selection transistor 26 is turned off and the selection transistor 26 is turned on within the time from time t2 to time t3. As a result, the charge remaining in the third charge accumulation section 28 is discharged to the power source VDD via the overflow gate transistor 29.

According to the present modification described above, since the pixel circuit 20a includes the overflow gate transistor 29, the charge remaining in the third charge accumulation section 28 can be discharged. As a result, blooming to other pixels P can be suppressed.

Second Modification

Figure 7:
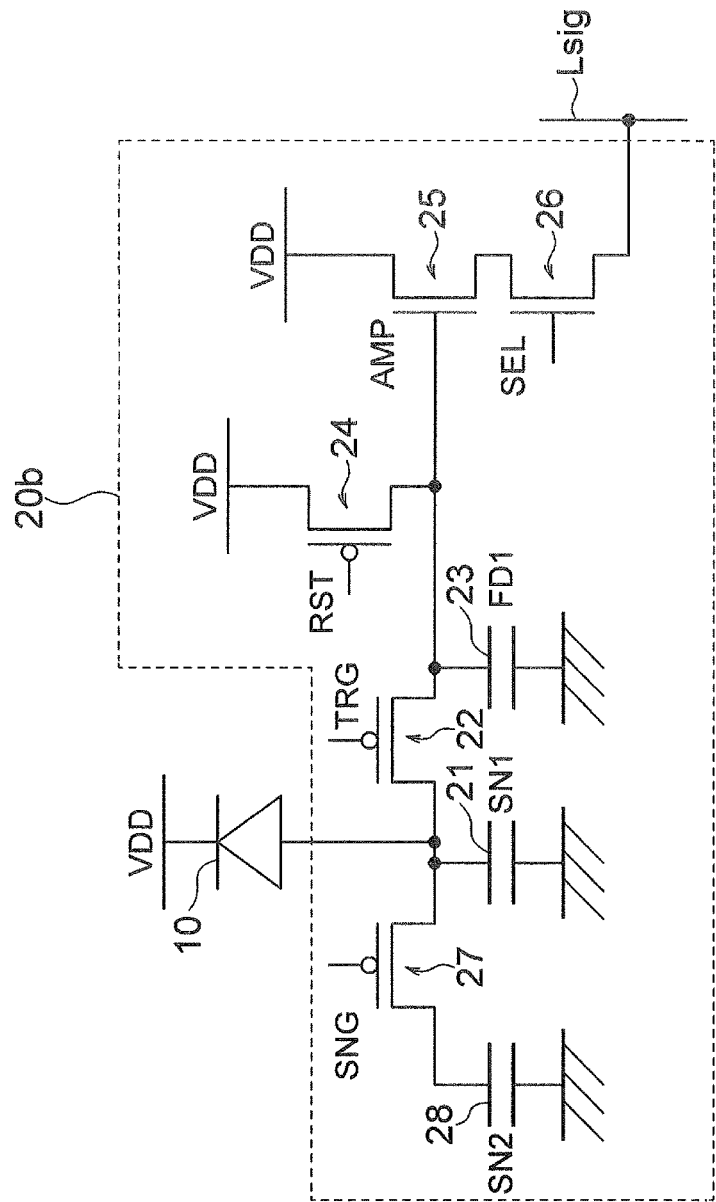
FIG. 7 is a circuit diagram illustrating a configuration of a pixel according to a second modification.
Figure 8:
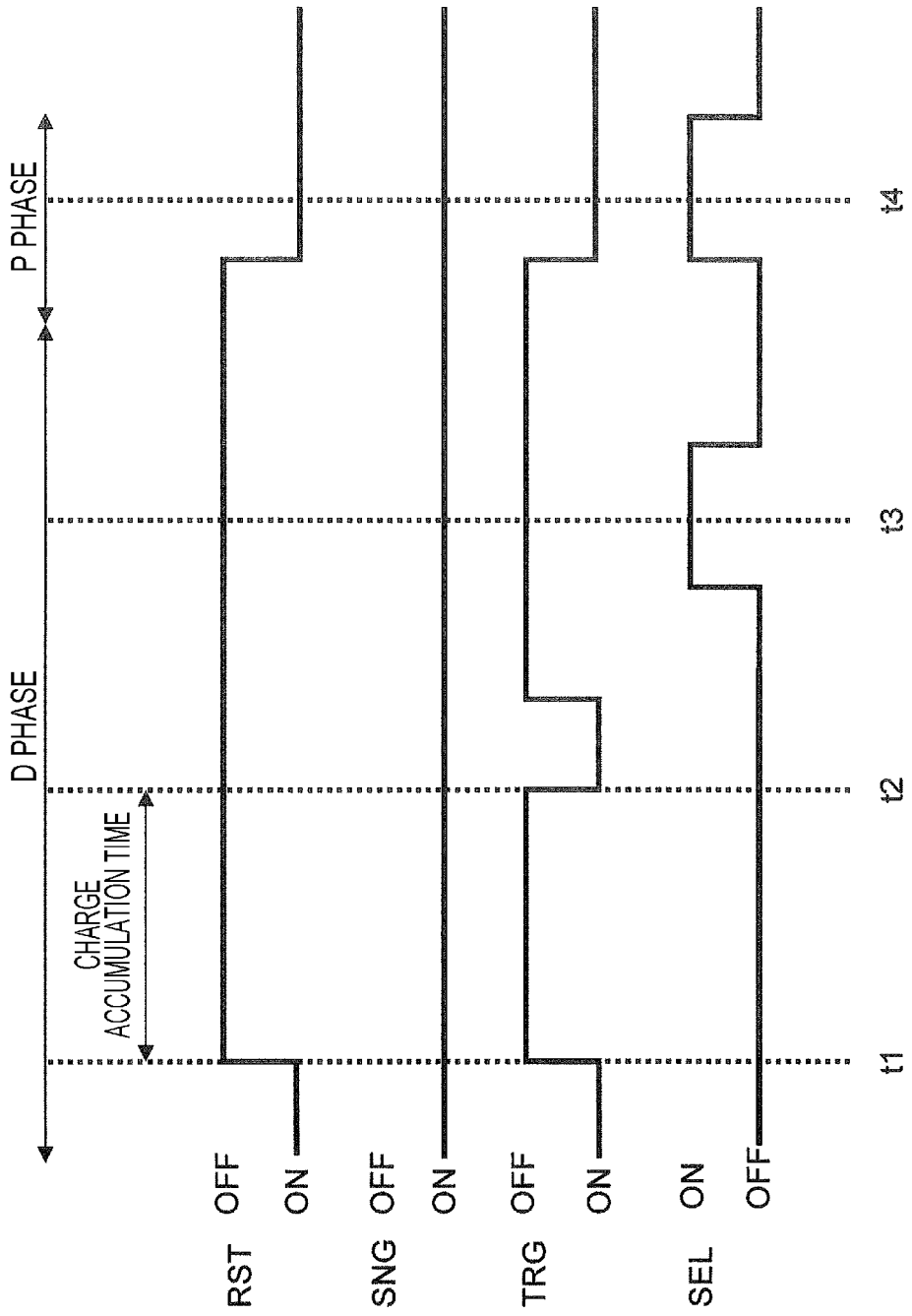
FIG. 8 is a timing chart illustrating an example of a readout operation of a pixel circuit according to the second modification.

FIG. 7 is a circuit diagram illustrating a configuration of a pixel according to a second modification. Furthermore, FIG. 8 is a timing chart illustrating an example of a readout operation of a pixel circuit according to the second modification.

In the pixel circuit 20 according to the first embodiment described above, as illustrated in FIG. 2, all of the transfer transistor 22, the reset transistor 24, and the changeover switch 27 include N-channel MOS transistors. On the other hand, in the pixel circuit 20b according to the present modification, as illustrated in FIG. 7, all of the transfer transistor 22, the reset transistor 24, and the changeover switch 27 include P-channel MOS transistors.

As described above, in the present modification, the conductivity types of the transfer transistor 22, the reset transistor 24, and the changeover switch 27 are opposite to those of the first embodiment. Therefore, in the present modification, as illustrated in FIG. 8, the signal level input to the gate of each transistor is opposite to that of the first embodiment.

According to the present modification described above, all of the transfer transistor 22, the reset transistor 24, and the changeover switch 27 include P-channel MOS transistors. Therefore, readout of signal charges from the photoelectric conversion element 10 is readout of holes that are positive charges. In this case, as compared with a case where these transistors include N-channel MOS transistors, charges are less likely to overflow from the first charge accumulation section 21, the second charge accumulation section 23, and the third charge accumulation section 28. Therefore, also in the present modification, blooming between the pixels P adjacent to each other can be suppressed.

Third Modification

Figure 9:
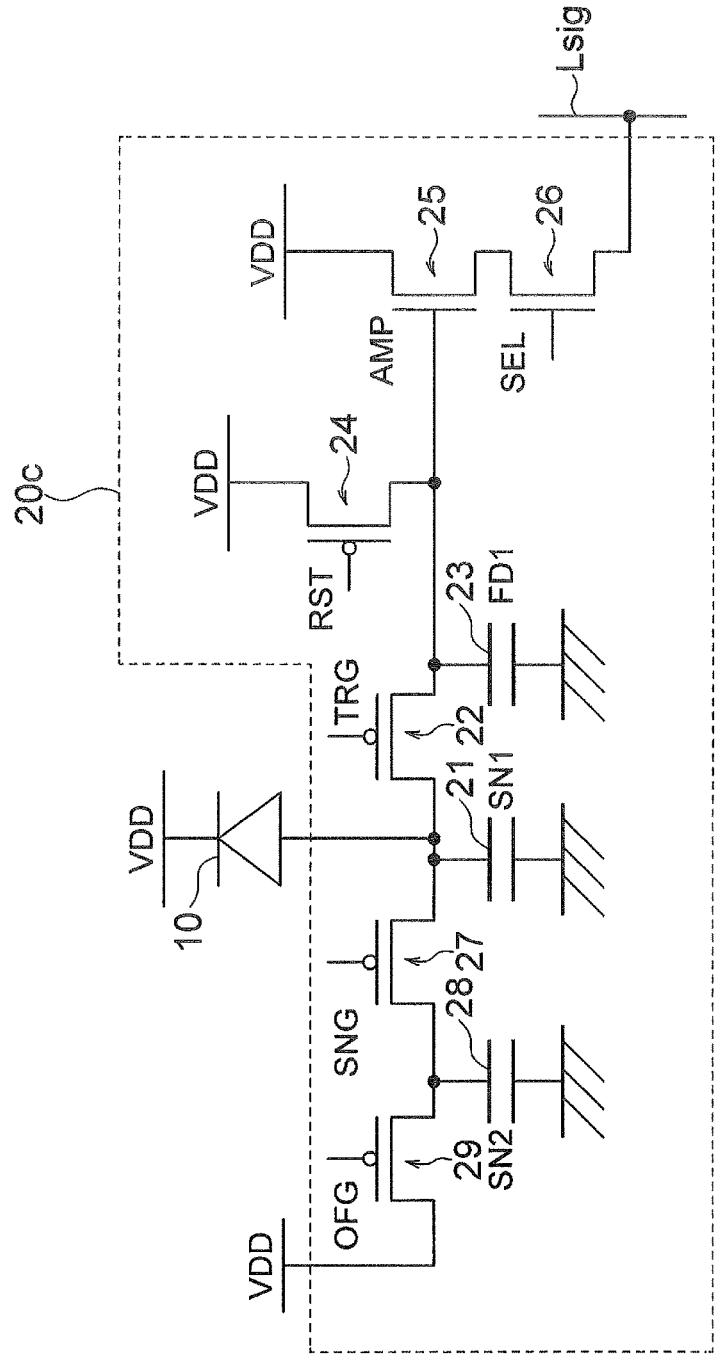
FIG. 9 is a circuit diagram illustrating a configuration of a pixel according to a third modification.

FIG. 9 is a circuit diagram illustrating a configuration of a pixel according to a third modification. The pixel circuit 20c illustrated in FIG. 9 is further provided with the overflow gate transistor 29 described in the first modification in addition to the components of the pixel circuit 20b of the second modification described above. However, in the present modification, the overflow gate transistor 29 includes the P-channel MOS transistor.

The pixel circuit 20c according to the present modification has a configuration in which the first modification and the second modification are combined. Therefore, the charge remaining in the third charge accumulation section 28 can be discharged by the overflow gate transistor 29, and furthermore, the charge is less likely to overflow from the first charge accumulation section 21, the second charge accumulation section 23, and the third charge accumulation section 28 by configuring the pixel transistor with the P-channel MOS transistor.

Therefore, according to the present modification, the blooming suppression effect can be enhanced.

Fourth Modification

Figure 10A:
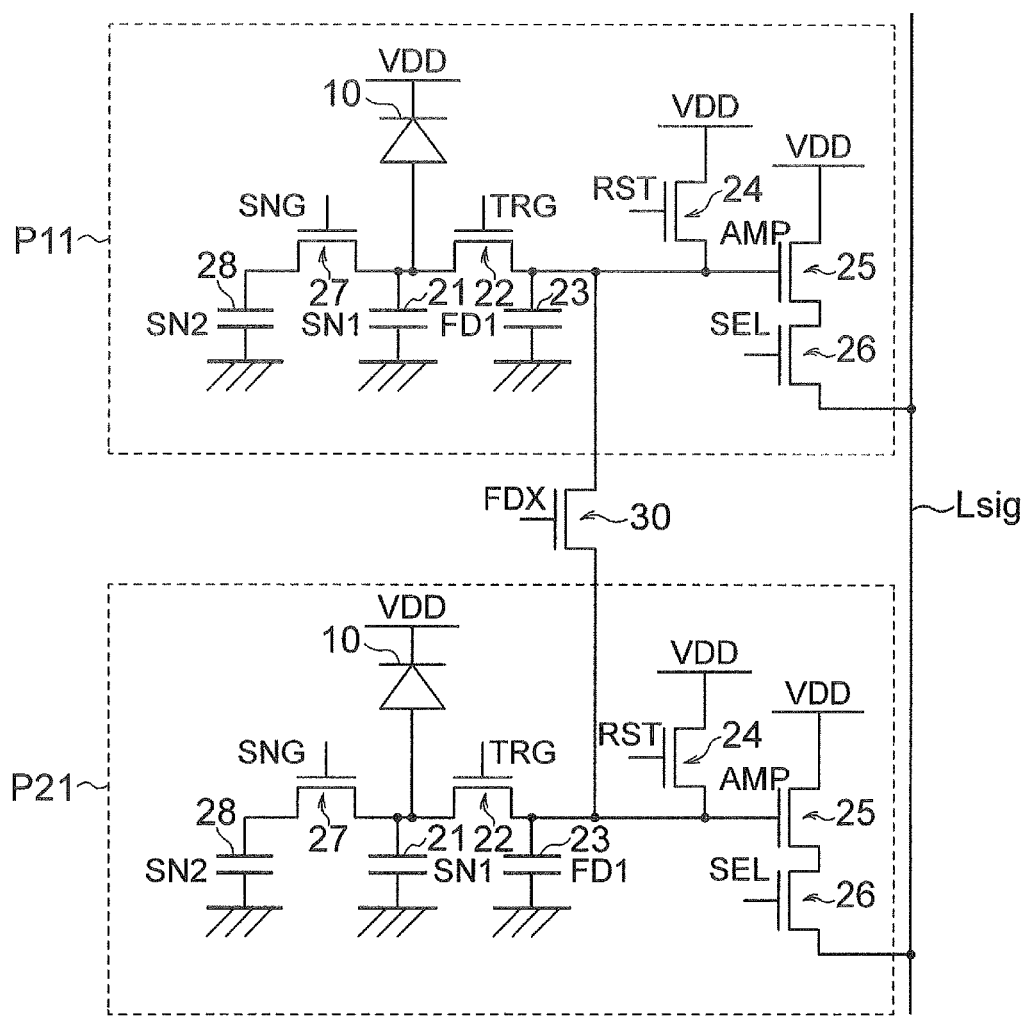
FIG. 10A is a circuit diagram illustrating a configuration of a pixel according to a fourth modification.
Figure 10B:
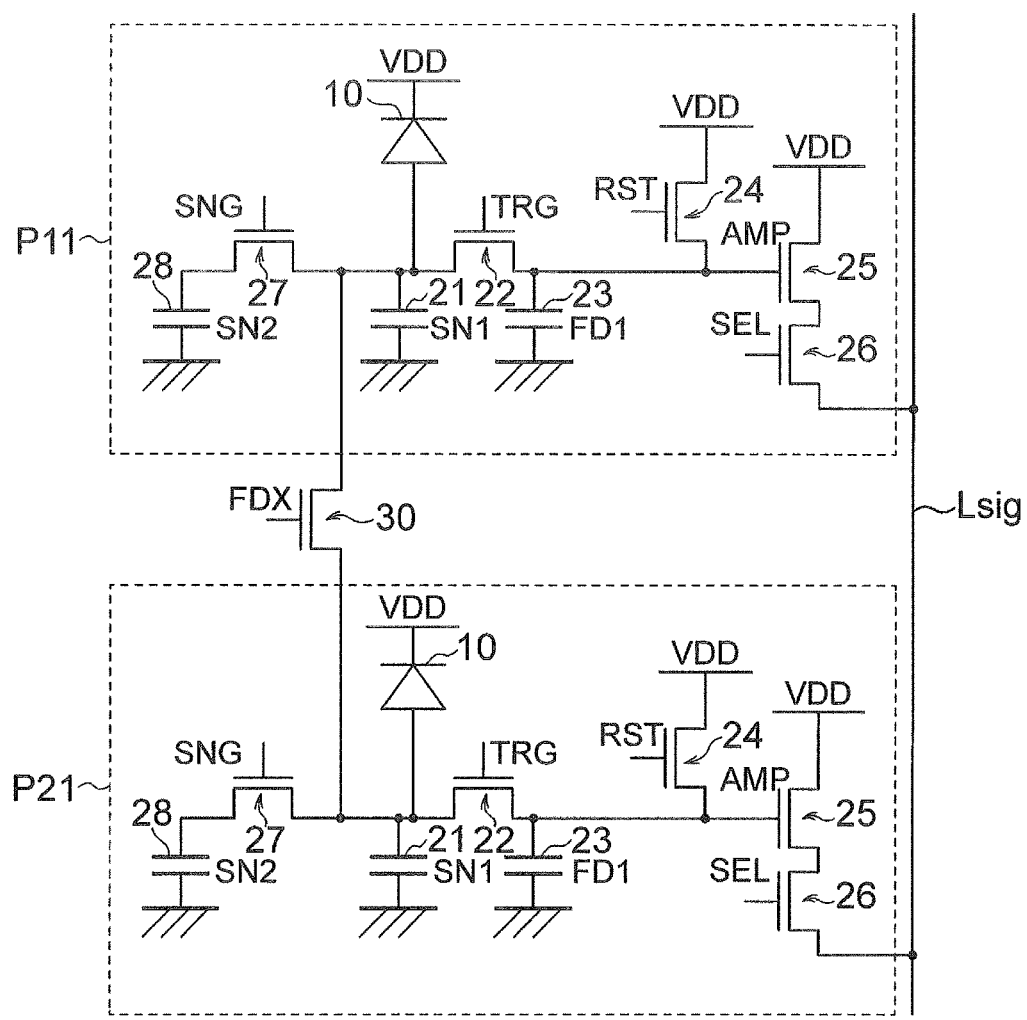
FIG. 10B is a circuit diagram illustrating the configuration of the pixel according to the fourth modification.
Figure 10C:
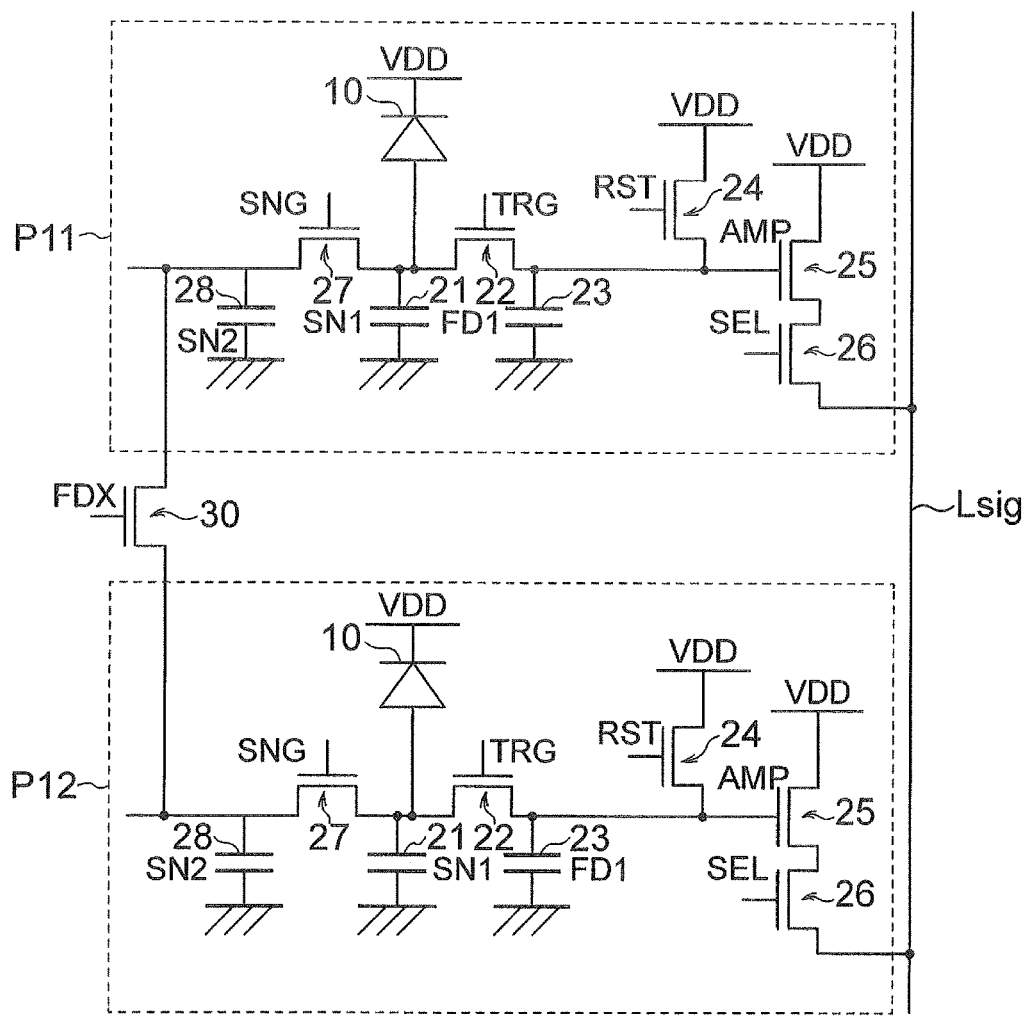
FIG. 10C is a circuit diagram illustrating the configuration of the pixel according to the fourth modification.

FIGS. 10A, 10B, and 10C are circuit diagrams illustrating a configuration of a pixel according to a fourth modification. Furthermore, FIG. 11 is a timing chart illustrating an example of a readout operation of a pixel circuit according to the fourth modification.

In the present modification, as illustrated in FIGS. 10A, 10B, and 10C, the changeover switch 30 is disposed between a pixel P11 and a pixel P12. The pixel P11 and the pixel P12 are commonly connected to the vertical signal line Lsig and are adjacent to each other. The changeover switch 30 corresponds to a third changeover switch and includes an N-channel MOS transistor.

In FIG. 10A, the drain of the changeover switch 30 is connected to the second charge accumulation section 23 of the pixel P11, and the source is connected to the second charge accumulation section 23 of the pixel P12. The changeover switch 30 is turned on and off on the basis of a signal input from the row scanning section 201 to the gate.

Figure 11:
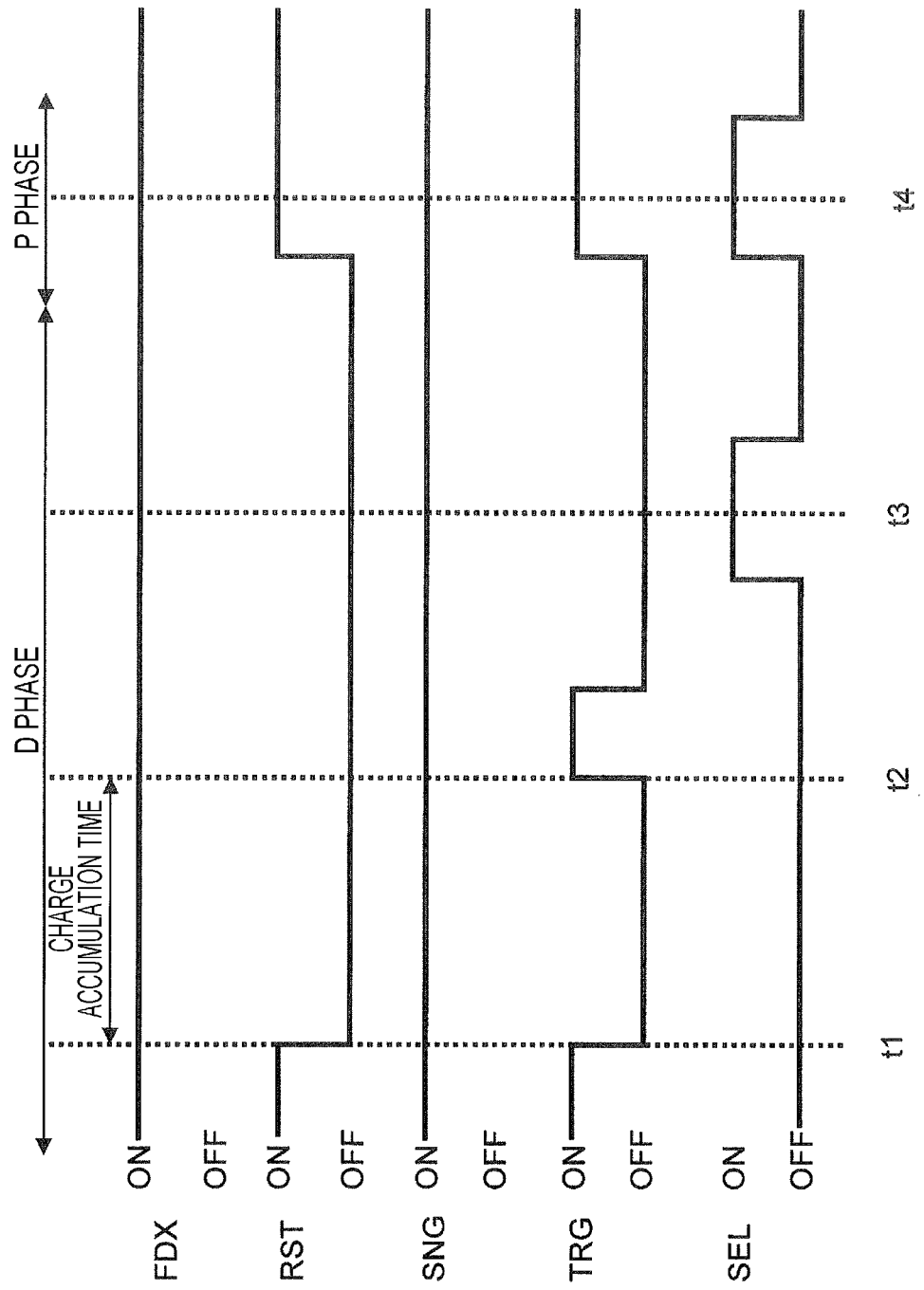
FIG. 11 is a timing chart illustrating an example of a readout operation of a pixel circuit according to the fourth modification.

As illustrated in FIG. 11, for example, when the changeover switch 30 (FDX) is in the always-on state within the time from time t1 to time t4 (within the periods of the D phase and the P phase), the second charge accumulation section 23 is shared between the pixel P11 and the pixel P12, and accordingly, the charges accumulated in the second charge accumulation section 23 are added. As a result, the sensitivity and the saturation signal amount are doubled. On the other hand, when the changeover switch 30 is always in the off state within the above time, since the second charge accumulation section 23 is not shared, the charges accumulated in each second charge accumulation section 23 are not added.

In FIG. 10B, the changeover switch 30 is disposed between the first charge accumulation section 21 of the pixel P11 and the first charge accumulation section 21 of the pixel P12. When the changeover switch 30 is in the always-on state, the first charge accumulation section 21 of the pixel P11 is connected to the first charge accumulation section 21 of the pixel P12 via the changeover switch 30. In this case, the first charge accumulation section 21 is shared between the pixel P11 and the pixel P12, whereby the charges accumulated in the first charge accumulation section 21 are added. As a result, the signal saturation amount is doubled. On the other hand, when the changeover switch 30 is always in the off state within the above time, since the first charge accumulation section 21 is not shared, the charges accumulated in each first charge accumulation section 21 are not added.

In FIG. 10C, the changeover switch 30 is disposed between the third charge accumulation section 28 of the pixel P11 and the third charge accumulation section 28 of the pixel P12. When the changeover switch 30 is in the always-on state, the third charge accumulation section 28 of the pixel P11 is connected to the third charge accumulation section 28 of the pixel P12 via the changeover switch 30. In this case, the third charge accumulation section 28 is shared between the pixel P11 and the pixel P12, whereby the charges accumulated in the third charge accumulation section 28 are added. As a result, the signal saturation amount is doubled. On the other hand, when the changeover switch 30 is always in the off state within the above time, since the third charge accumulation section 28 is not shared, the charges accumulated in each third charge accumulation section 28 are not added.

According to the present modification described above, the changeover switch 30 can switch whether or not to connect the first charge accumulation section 21, the second charge accumulation section 23, or the third charge accumulation section 28 disposed in the pixels adjacent to each other. As a result, the sensitivity and the saturation signal amount can be adjusted. Note that, in the present modification, the changeover switch 30 is disposed between pixels adjacent in a direction parallel to the vertical signal line Lsig (vertical direction), but may be disposed between pixels adjacent in a direction orthogonal to the vertical signal line Lsig (horizontal direction).

Second Embodiment

Figure 12A:
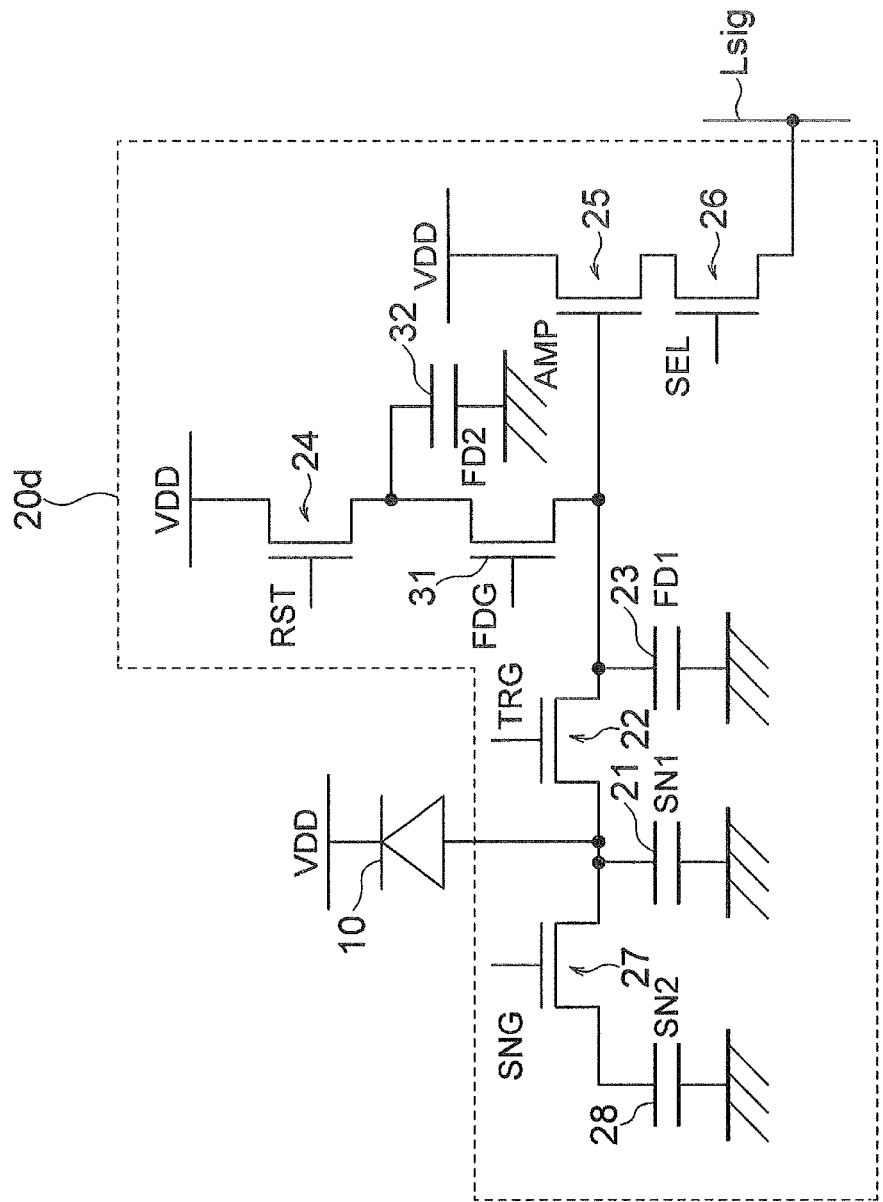
FIG. 12A is a circuit diagram illustrating a configuration of a pixel according to a second embodiment.
Figure 12B:
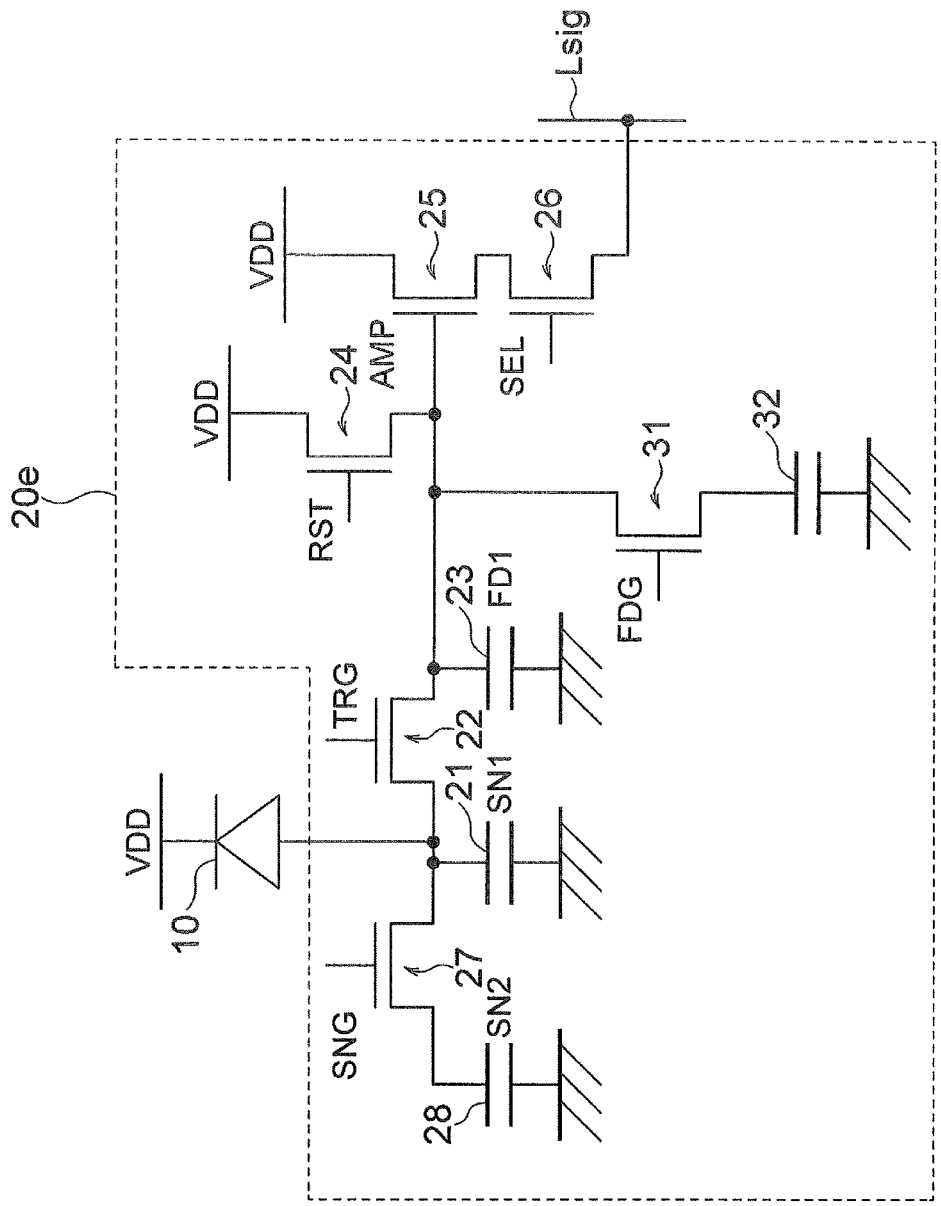
FIG. 12B is a circuit diagram illustrating the configuration of the pixel according to the second embodiment.

FIGS. 12A and 12B are circuit diagrams illustrating a configuration of a pixel according to a second embodiment. Components similar to those of the first embodiment described above are denoted by the same reference numerals, and detailed description thereof will be omitted.

A pixel circuit 20d illustrated in FIG. 12A and a pixel circuit 20e illustrated in FIG. 12B further include a changeover switch 31 and a fourth charge accumulation section 32 in addition to the components of the pixel circuit 20 described in the first embodiment. The changeover switch 31 corresponds to a second changeover switch and includes an N-channel MOS transistor. The fourth charge accumulation section 32 includes a capacitor.

In the pixel circuit 20d illustrated in FIG. 12A, in the changeover switch 31, the drain is connected to the source of the reset transistor 24, and the source is connected to the second charge accumulation section 23. The changeover switch 31 is turned on and off on the basis of a signal input from the row scanning section 201 to the gate. One end of the fourth charge accumulation section 32 is connected to the source of the reset transistor 24 and the drain of the changeover switch 31, and the other end is grounded. When the transfer transistor 22 and the changeover switch 31 are turned on, the charge accumulated in the first charge accumulation section 21 is also transferred to the fourth charge accumulation section 32 together with the second charge accumulation section 23.

On the other hand, in the pixel circuit 20e illustrated in FIG. 12B, the drain of the changeover switch 31 is connected to the sources of the second charge accumulation section 23 and the reset transistor 24, and the gate of the amplification transistor 25. The source is connected to one end of the fourth charge accumulation section 32. The other end of the fourth charge accumulation section 32 is grounded. That is, the fourth charge accumulation section 32 is connected to the second charge accumulation section 23 via the changeover switch 31.

In the pixel circuit 20d and the pixel circuit 20e configured as described above, the conversion efficiency is changed by the changeover switch 27 switching whether or not to connect the third charge accumulation section 28 to the photoelectric conversion element 10 and the changeover switch 31 switching whether or not to connect the fourth charge accumulation section 32 to the second charge accumulation section 23. When the changeover switch 27 is turned on, the conversion efficiency decreases. Conversely, when the changeover switch 27 is turned off, the conversion efficiency increases.

The following Formula (2) shows conversion efficiency (Low) when the changeover switch 27 and the changeover switch 31 are turned on and conversion efficiency (Hi) when the changeover switch 27 and the changeover switch 31 are turned off.

In Formula (2), $C_{fd2}$ is the capacitance of the fourth charge accumulation section 32.

[Mathematical Formula 2]

$$\text{Conversion efficiency (Hi):} \frac{q}{(C_{fd1} + C_{sn1})} \quad (2)$$

$$\text{Conversion efficiency (Low):} \frac{q}{(C_{fd1} + C_{fd2} + C_{sn1} + C_{sn2})}$$

According to Formula (2), the conversion efficiency (Low) depends on the capacitance of each of the first charge accumulation section 21, the second charge accumulation section 23, the third charge accumulation section 28, and the fourth charge accumulation section 32. At this time, as the capacitance $C_{fd2}$ of the fourth charge accumulation section 32 increases, the saturation signal amount also increases. Therefore, the capacitance $C_{fd2}$ of the fourth charge accumulation section 32 is desirably larger than the capacitance $C_{fd1}$ of the second charge accumulation section 23.

Furthermore, the readout noise depends on a balance between a first addition value of the capacitance $C_{sn1}$ and the capacitance $C_{sn2}$ and a second addition value of the capacitance $C_{fd1}$ and the capacitance $C_{fd2}$. For example, the first addition value is desirably equal to the second addition value.

In the present embodiment, at low illuminance when the amount of light incident on the photoelectric conversion element 10 is smaller than the reference value, readout noise can be reduced by turning off the changeover switch 27 and the changeover switch 31. On the other hand, at high illuminance when the amount of light incident on the photoelectric conversion element 10 is higher than the reference value, the saturation signal amount can be increased by turning on the changeover switch 27 and the changeover switch 31.

Figure 13:
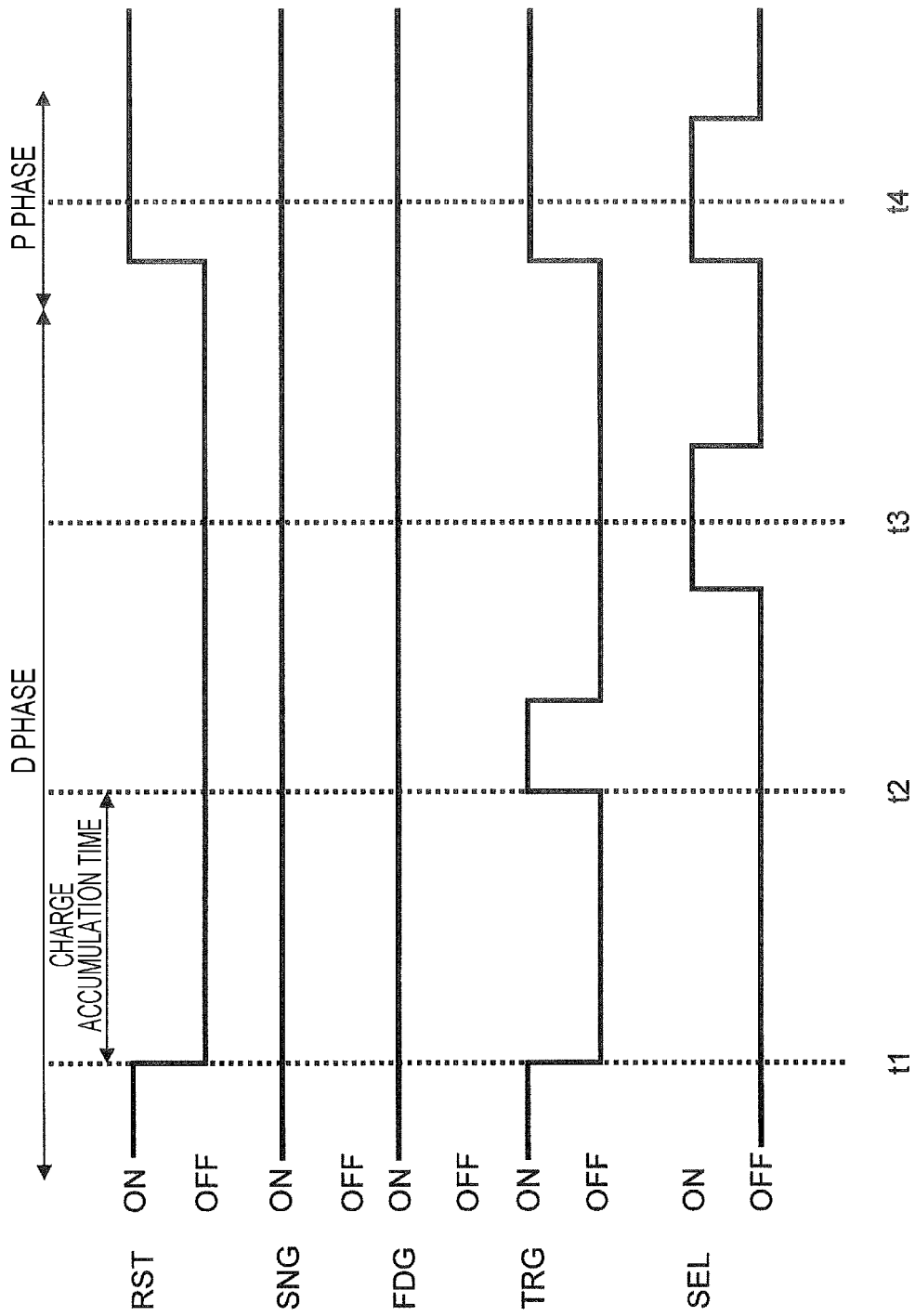
FIG. 13 is a timing chart illustrating an example of a readout operation of a pixel circuit according to the second embodiment.

FIG. 13 is a timing chart illustrating an example of the readout operation of the pixel circuits 20d and 20e according to the second embodiment. In this readout operation, the conversion efficiency (Low) is set. In this case, in the present embodiment, not only the changeover switch 27 (SNG) but also the changeover switch 31 (FDG) is always in an on state regardless of the D phase and the P phase. On the other hand, in the readout operation set to the conversion efficiency (Hi), the changeover switch 27 and the changeover switch 31 are always in an off state regardless of the D phase and the P phase. In this manner, the changeover switch 31 operates in synchronization with the changeover switch 27.

Note that, also in the present embodiment, similarly to the first embodiment, the reset transistor 24, the transfer transistor 22, and the selection transistor 26 may be driven in the timing chart illustrated in FIG. 11. In this case, the charge set to the conversion efficiency (Hi) and the charge set to the conversion efficiency (Low) can be simultaneously read out by one exposure. Also, in this readout operation, the charge having overflowed from the second charge accumulation section 23 via the changeover switch 31 is accumulated in the fourth charge accumulation section 32, whereby the dynamic range can be expanded by one exposure.

According to the present embodiment described above, the conversion efficiency can be switched by controlling on and off of the changeover switch 31 in addition to the changeover switch 27. Furthermore, by adjusting the balance between an SN capacitance of the first charge accumulation section 21 and the third charge accumulation section 28 and an FD capacitance of the second charge accumulation section 23 and the fourth charge accumulation section 32, imaging with a high SN ratio can be performed under wider illuminance conditions.

Fifth Modification

Some modifications of the second embodiment will be described below. Components similar to those of the second embodiment described above are denoted by the same reference numerals, and detailed description thereof will be omitted.

Figure 14A:
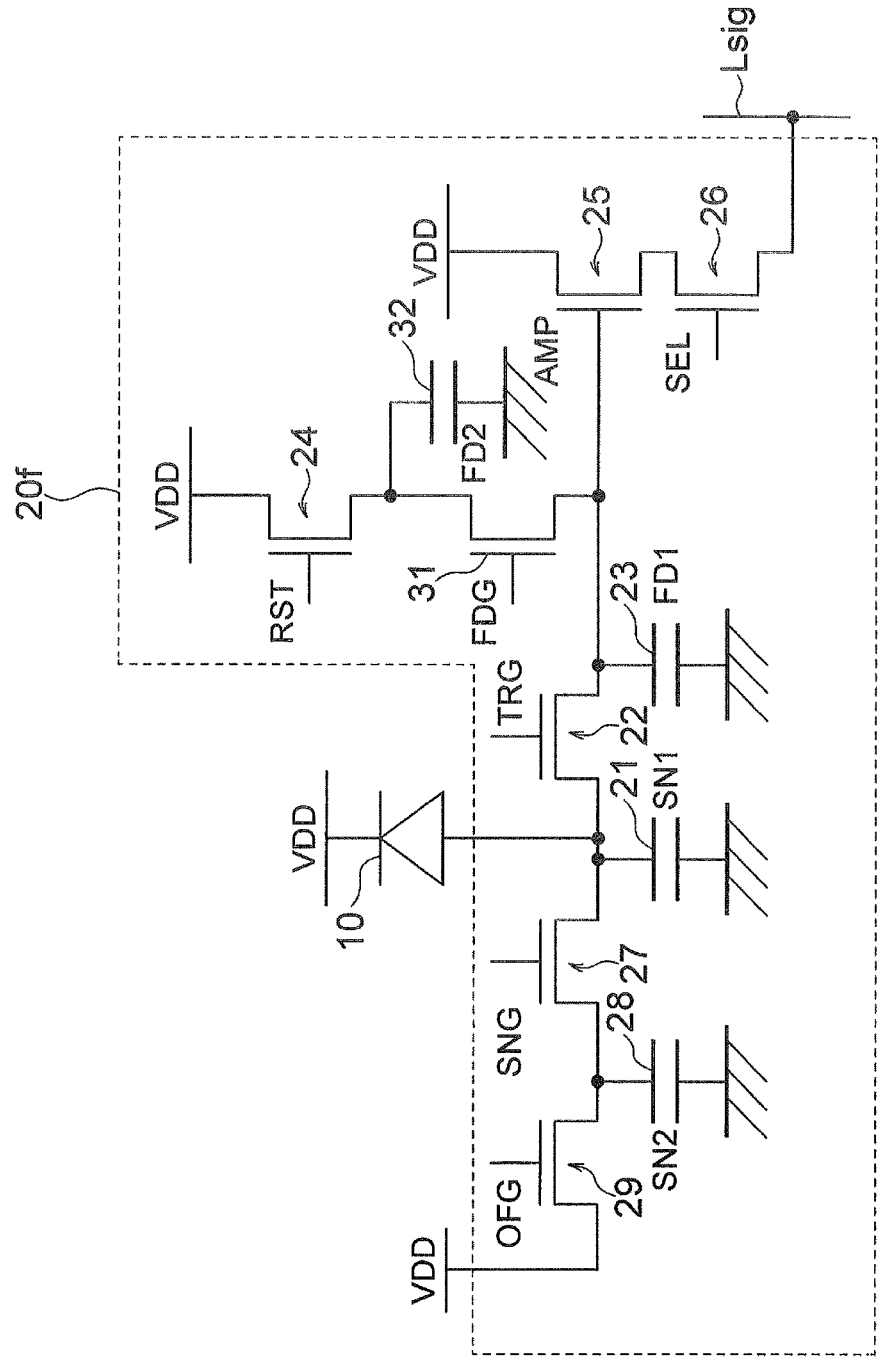
FIG. 14A is a circuit diagram illustrating a configuration of a pixel according to a fifth modification.
Figure 14B:
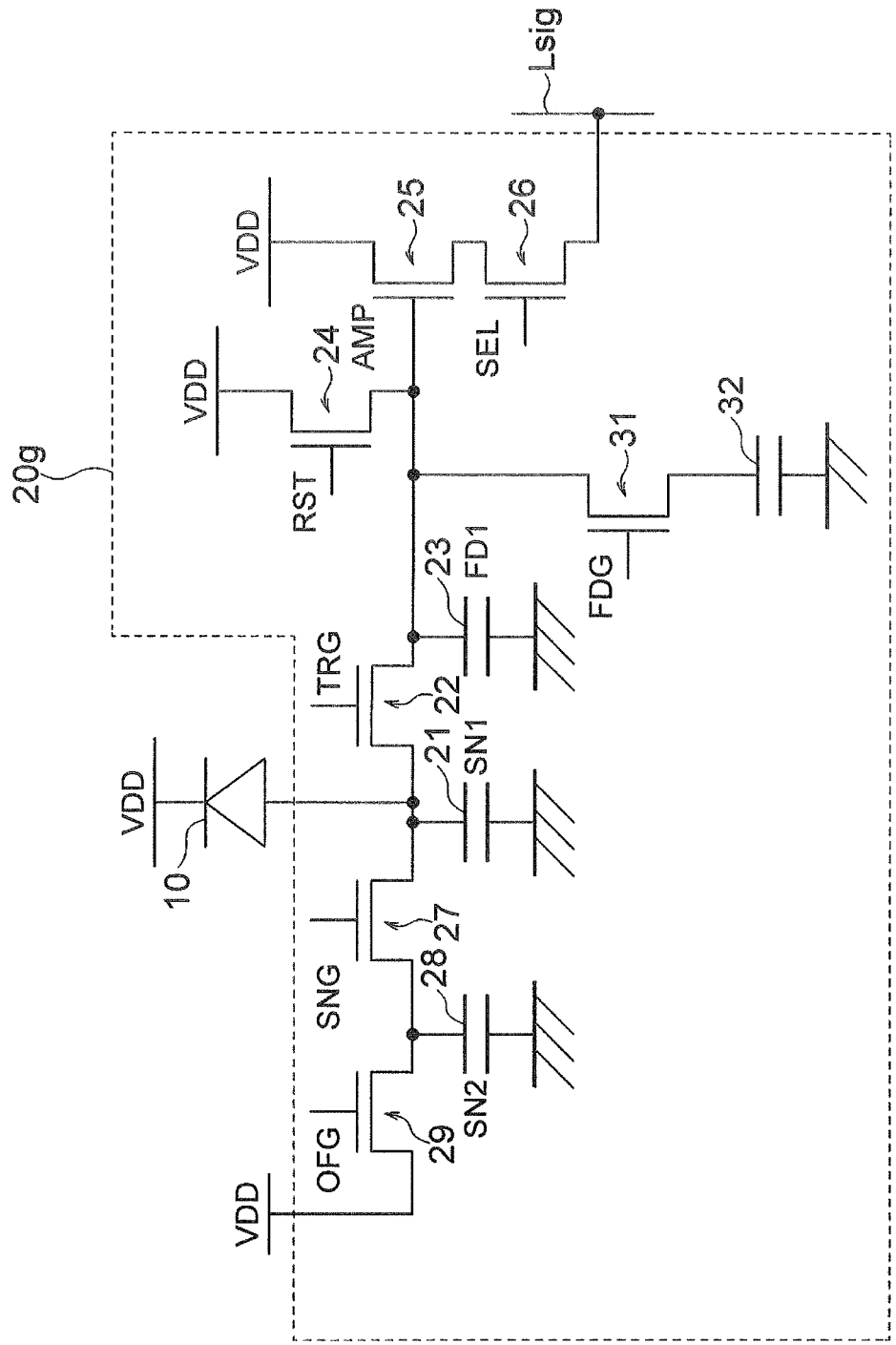
FIG. 14B is a circuit diagram illustrating the configuration of the pixel according to the fifth modification.

FIGS. 14A and 14B are circuit diagrams illustrating a configuration of a pixel according to a fifth modification.

A pixel circuit 20f illustrated in FIG. 14A and a pixel circuit 20g illustrated in FIG. 14B further include the overflow gate transistor 29 similarly to the first modification described above.

In the present modification, the overflow gate transistor 29 is driven in the timing chart illustrated in FIG. 6, similarly to the first modification. That is, in the time from time t2 to time t3, the overflow gate transistor 29 is switched from the off state to the on state until the selection transistor 26 is turned off and the selection transistor 26 is turned on. As a result, the charge remaining in the third charge accumulation section 28 is discharged to the power source VDD via the overflow gate transistor 29. At this time, the changeover switch 31 is always in an off state together with the changeover switch 27 in a case where the conversion efficiency (Hi) is set, and is always in an on state together with the changeover switch 27 in a case where the conversion efficiency (Low) is set.

According to the present modification described above, since the pixel circuits 20f and 20g have the overflow gate transistor 29, the charge remaining in the third charge accumulation section 28 can be discharged. As a result, blooming to other pixels P can be suppressed.

Sixth Modification

Figure 15A:
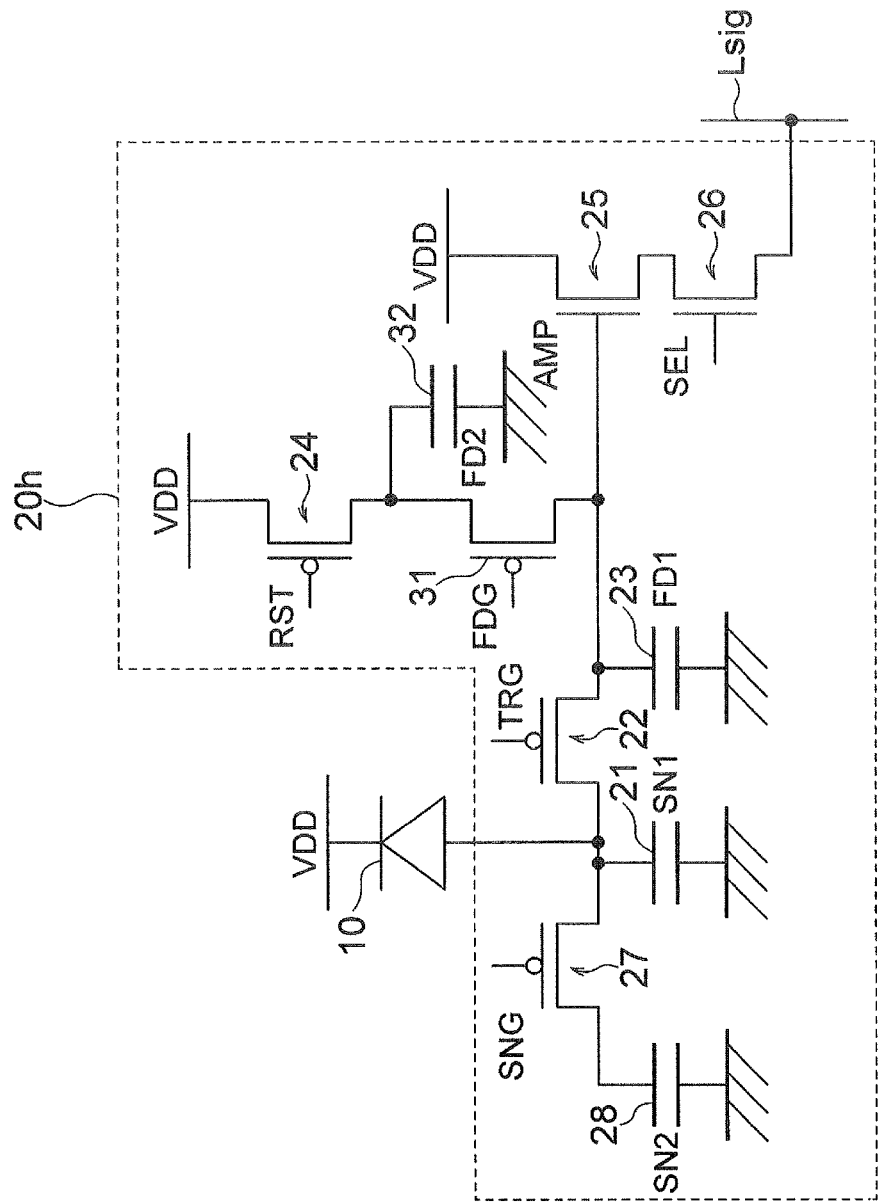
FIG. 15A is a circuit diagram illustrating a configuration of a pixel according to a sixth modification.
Figure 15B:
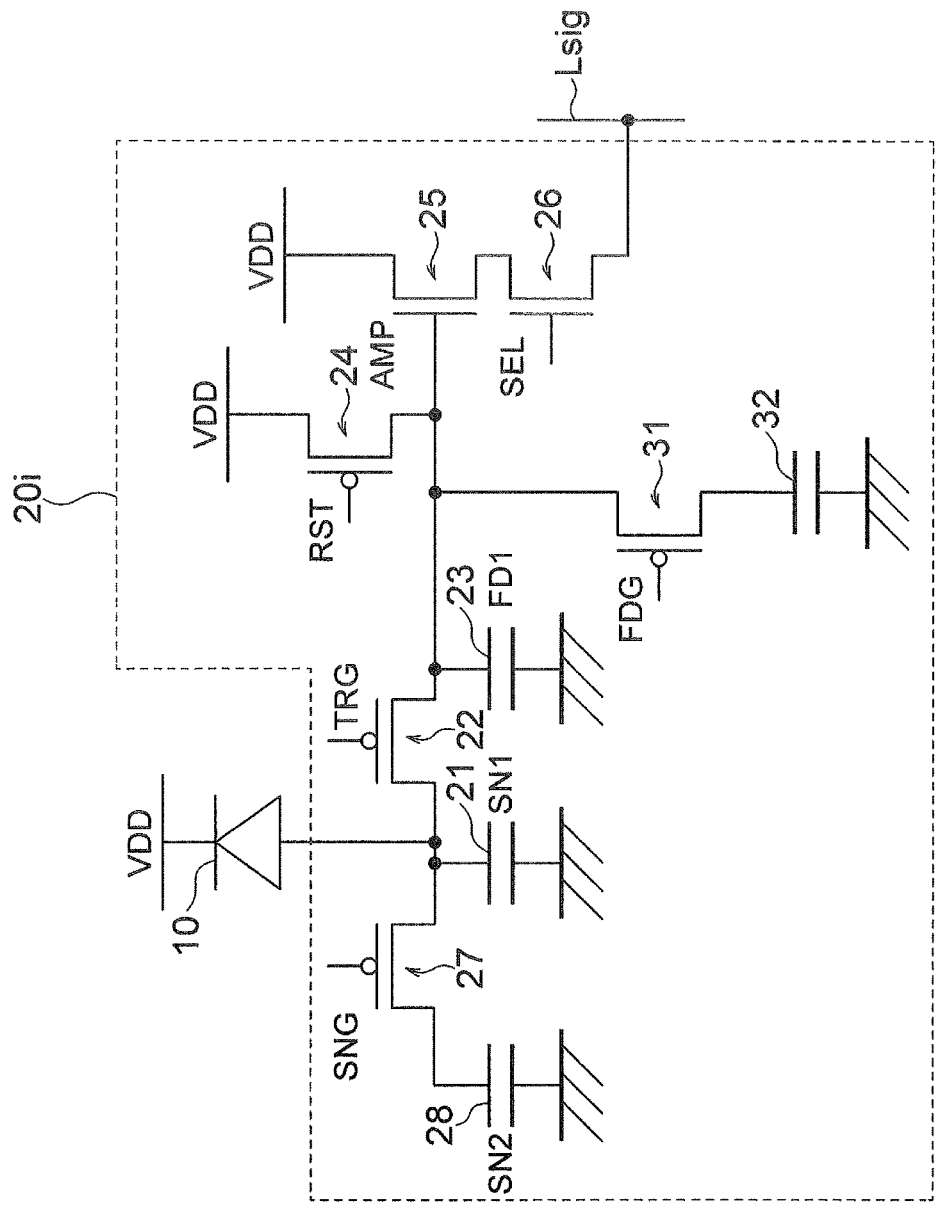
FIG. 15B is a circuit diagram illustrating the configuration of the pixel according to the sixth modification.

FIGS. 15A and 15B are circuit diagrams illustrating a configuration of a pixel according to a sixth modification. Comparing a pixel circuit 20h illustrated in FIG. 15A with the pixel circuit 20d illustrated in FIG. 12A, all of the transfer transistor 22, the reset transistor 24, the changeover switch 27, and the changeover switch 31 include P-channel MOS transistors instead of N-channel MOS transistors.

Similarly, comparing a pixel circuit 20i illustrated in FIG. 15B with the pixel circuit 20e illustrated in FIG. 12B, all of the transfer transistor 22, the reset transistor 24, the changeover switch 27, and the changeover switch 31 include P-channel MOS transistors instead of N-channel MOS transistors.

As described above, in the present modification, the conductivity types of the transfer transistor 22, the reset transistor 24, the changeover switch 27, and the changeover switch 31 are opposite to those of the second embodiment. Therefore, in the present modification, the signal level input to the gate of each transistor is opposite to that of the second embodiment.

According to the present modification described above, all of the transfer transistor 22, the reset transistor 24, the changeover switch 27, and the changeover switch 31 include P-channel MOS transistors. Therefore, readout of signal charges from the photoelectric conversion element 10 is readout of holes that are positive charges. Therefore, the charges are less likely to overflow from the first charge accumulation section 21, the second charge accumulation section 23, the third charge accumulation section 28, and the fourth charge accumulation section 32. Therefore, also in the present modification, blooming between adjacent pixels can be suppressed.

Seventh Modification

Figure 16A:
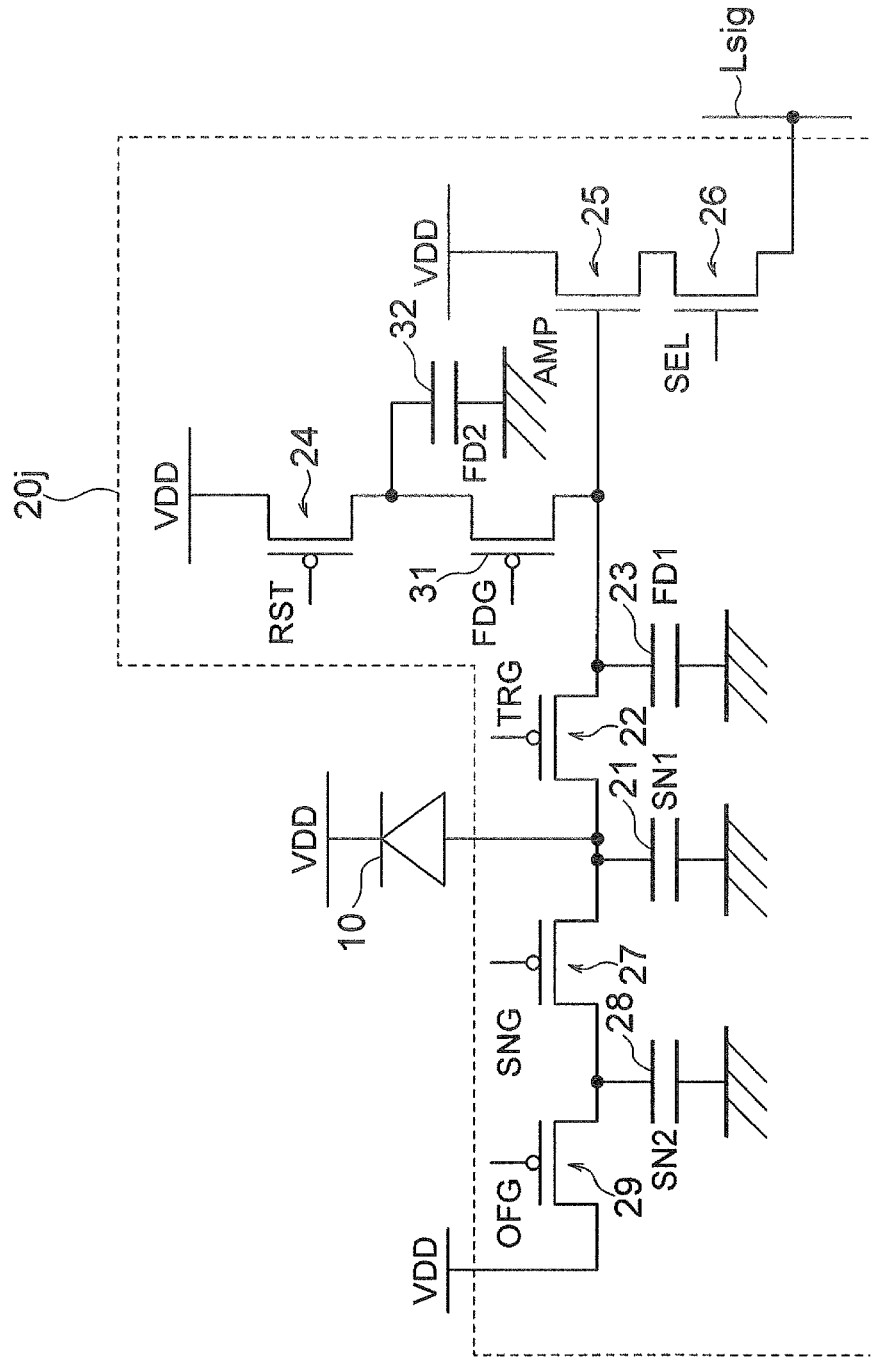
FIG. 16A is a circuit diagram illustrating a configuration of a pixel according to a seventh modification.
Figure 16B:
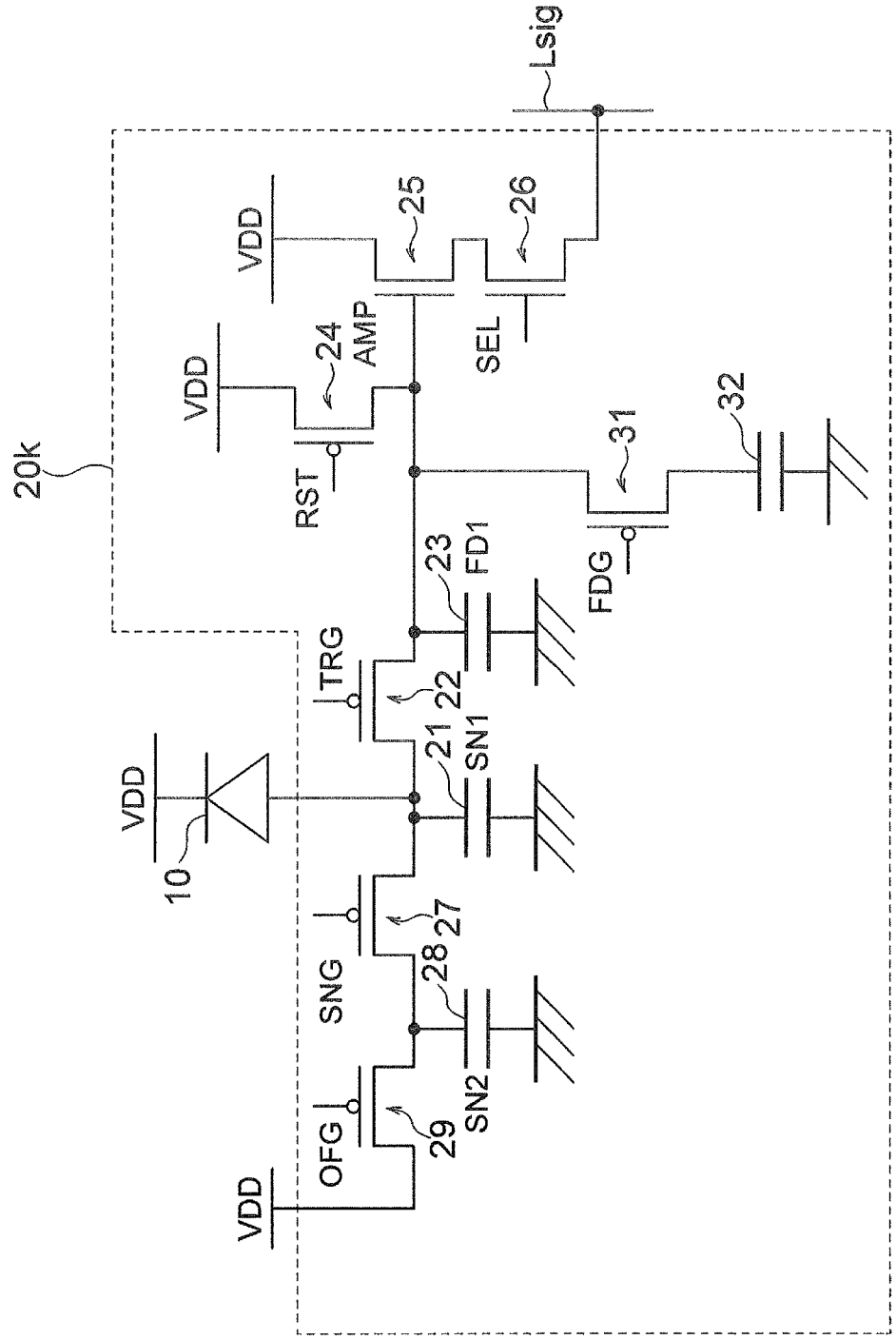
FIG. 16B is a circuit diagram illustrating the configuration of the pixel according to the seventh modification.

FIGS. 16A and 16B are circuit diagrams illustrating a configuration of a pixel according to a seventh modification. Comparing a pixel circuit 20j illustrated in FIG. 16A with the pixel circuit 20f illustrated in FIG. 14A, all of the transfer transistor 22, the reset transistor 24, the changeover switch 27, the changeover switch 31, and the overflow gate transistor 29 include P-channel MOS transistors instead of N-channel MOS transistors.

Similarly, comparing a pixel circuit 20k illustrated in FIG. 16B with the pixel circuit 20g illustrated in FIG. 14B, all of the transfer transistor 22, the reset transistor 24, the changeover switch 27, the changeover switch 31, and the overflow gate transistor 29 include P-channel MOS transistors instead of N-channel MOS transistors.

The pixel circuit 20k according to the present modification has a configuration in which the fifth modification and the sixth modification are combined. Therefore, the charge remaining in the third charge accumulation section 28 can be discharged by the overflow gate transistor 29, and furthermore, the charge is less likely to overflow from the first charge accumulation section 21, the second charge accumulation section 23, and the third charge accumulation section 28 by configuring the pixel transistor with the P-channel MOS transistor.

Therefore, according to the present modification, the blooming suppression effect can be enhanced.

Eighth Modification

Figure 17A:
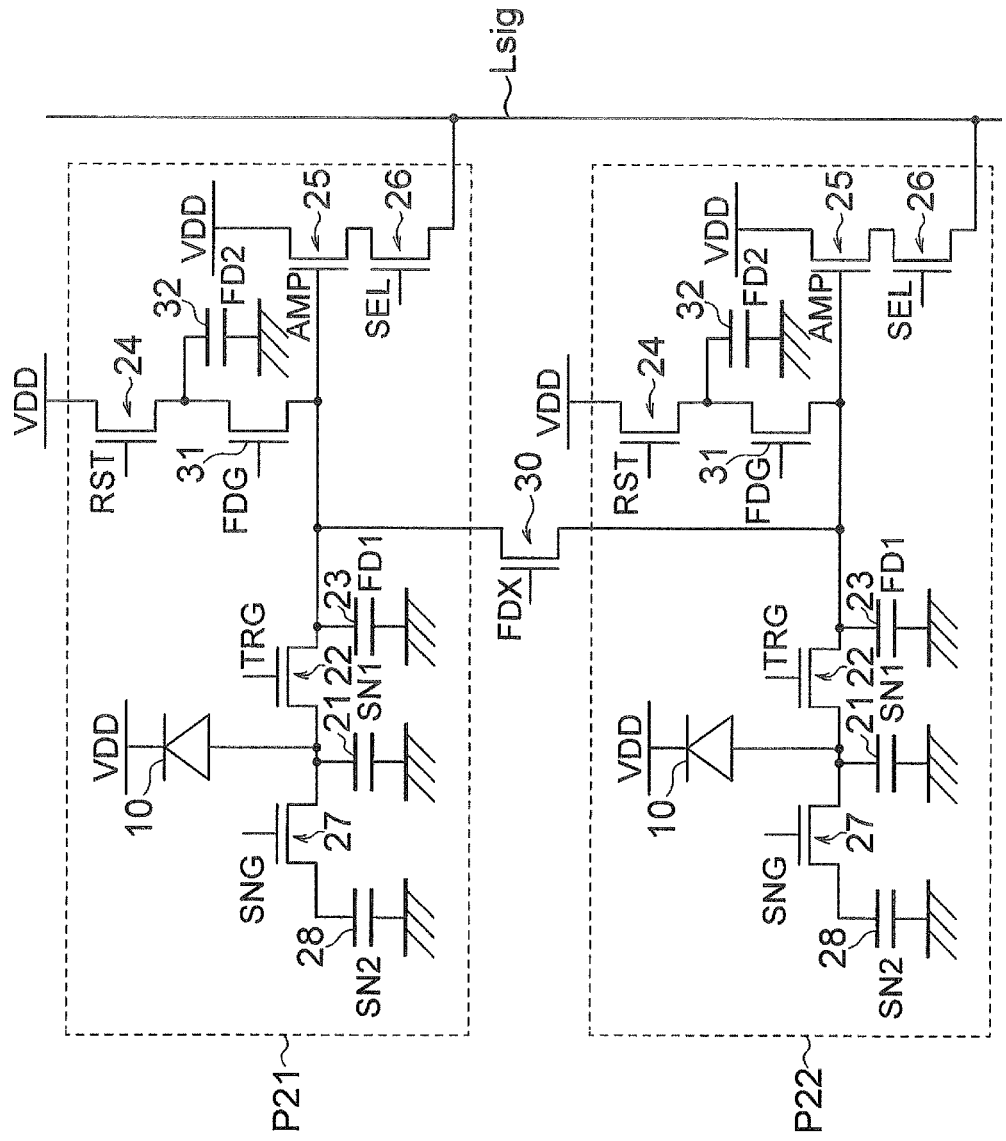
FIG. 17A is a circuit diagram illustrating a configuration of the pixel according to the sixth modification.

FIGS. 17A and 17B are circuit diagrams illustrating a configuration of a pixel according to an eighth modification. In the present modification, similarly to the above-described fourth modification, the changeover switch 30 is disposed between the pixel P21 and the pixel P22. The pixel P21 and the pixel P22 are commonly connected to the vertical signal line Lsig and are adjacent to each other.

In FIG. 17A, each of the pixel P21 and the pixel P22 includes the pixel circuit 20d illustrated in FIG. 12A. On the other hand, in FIG. 17B, each of the pixel P21 and the pixel P22 includes the pixel circuit 20e illustrated in FIG. 12B. Furthermore, the drain of the changeover switch 30 is connected between the second charge accumulation section 23 of the pixel P21 and the changeover switch 31, and the source is connected between the second charge accumulation section 23 of the pixel P22 and the changeover switch 31.

Also in the present modification, similarly to the fourth modification, in a case where the charges of the pixel P21 and the pixel P22 are added, the changeover switch 31 is always turned on within the periods of the D phase and the P phase. Conversely, in a case where no charge is added, the changeover switch 31 is always in an off state within the D-phase and P-phase periods.

Note that a connection form of the changeover switch 30 is not limited to the arrangement illustrated in FIGS. 17A and 17B. The changeover switch 30 may switch the connection between the second charge accumulation sections 21 similarly to FIG. 10B, or may switch the connection between the third charge accumulation sections 28 similarly to in FIG. 10C.

According to the present modification described above, the changeover switch 30 can switch whether or not to connect the first charge accumulation section 21, the second charge accumulation section 23, or the third charge accumulation section 28 disposed in the pixels adjacent to each other. As a result, the sensitivity and the saturation signal amount can be adjusted. Note that, in the present modification, the changeover switch 30 is disposed between pixels adjacent in a direction parallel to the vertical signal line Lsig, but may be disposed between pixels adjacent in a direction orthogonal to the vertical signal line Lsig.

Application Example

Figure 18:
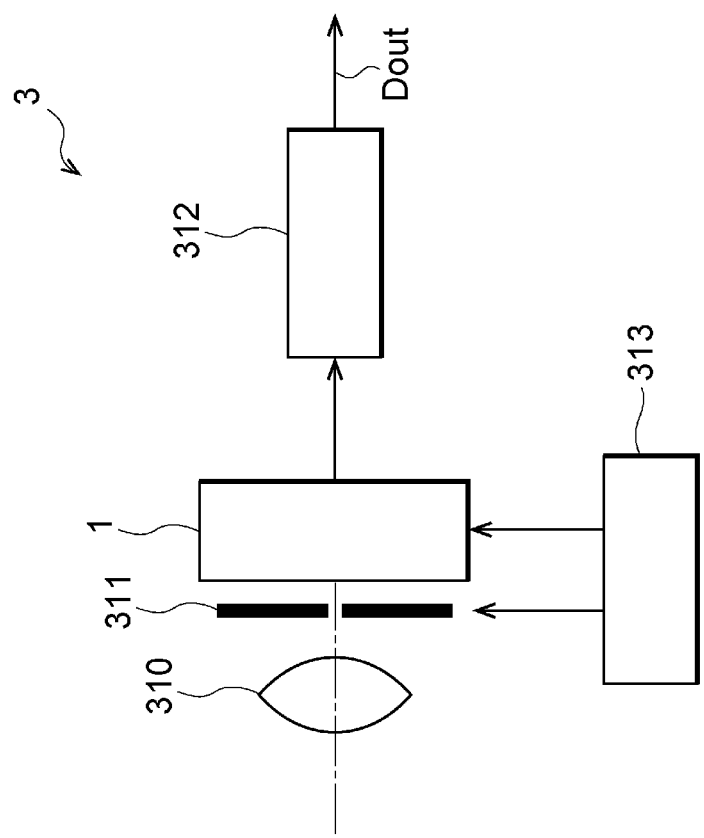
FIG. 18 is a functional block diagram illustrating an example of an electronic device.

The imaging device 1 described above can be applied to various types of electronic devices in addition to a camera capable of imaging an infrared region. FIG. 18 illustrates a schematic configuration of an electronic device 3 (camera) as an example. The electronic device 3 is, for example, a camera capable of capturing a still image or a moving image, and includes the imaging device 1, an optical system 310, a shutter device 311, a drive section 313 that drives the imaging device 1 and the shutter device 311, and a signal processing section 312.

The optical system 310 guides image light (incident light) from a subject to the imaging device 1. The optical system 310 may include a plurality of optical lenses. The shutter device 311 controls a light irradiation period and a light shielding period for the imaging device 1. The drive section 313 controls a transfer operation of the imaging device 1 and a shutter operation of the shutter device 311. The signal processing section 312 performs various types of signal processing on a signal output from the imaging device 1. A video signal Dout after the signal processing is stored in a storage medium such as a memory or output to a monitor and the like.

Example of Application to In-vivo Information Acquisition System

Furthermore, the technology according to the present disclosure (present technology) can be applied to a wide variety of products. For example, the technology according to the present disclosure may be applied to an endoscopic surgical system.

Figure 19:
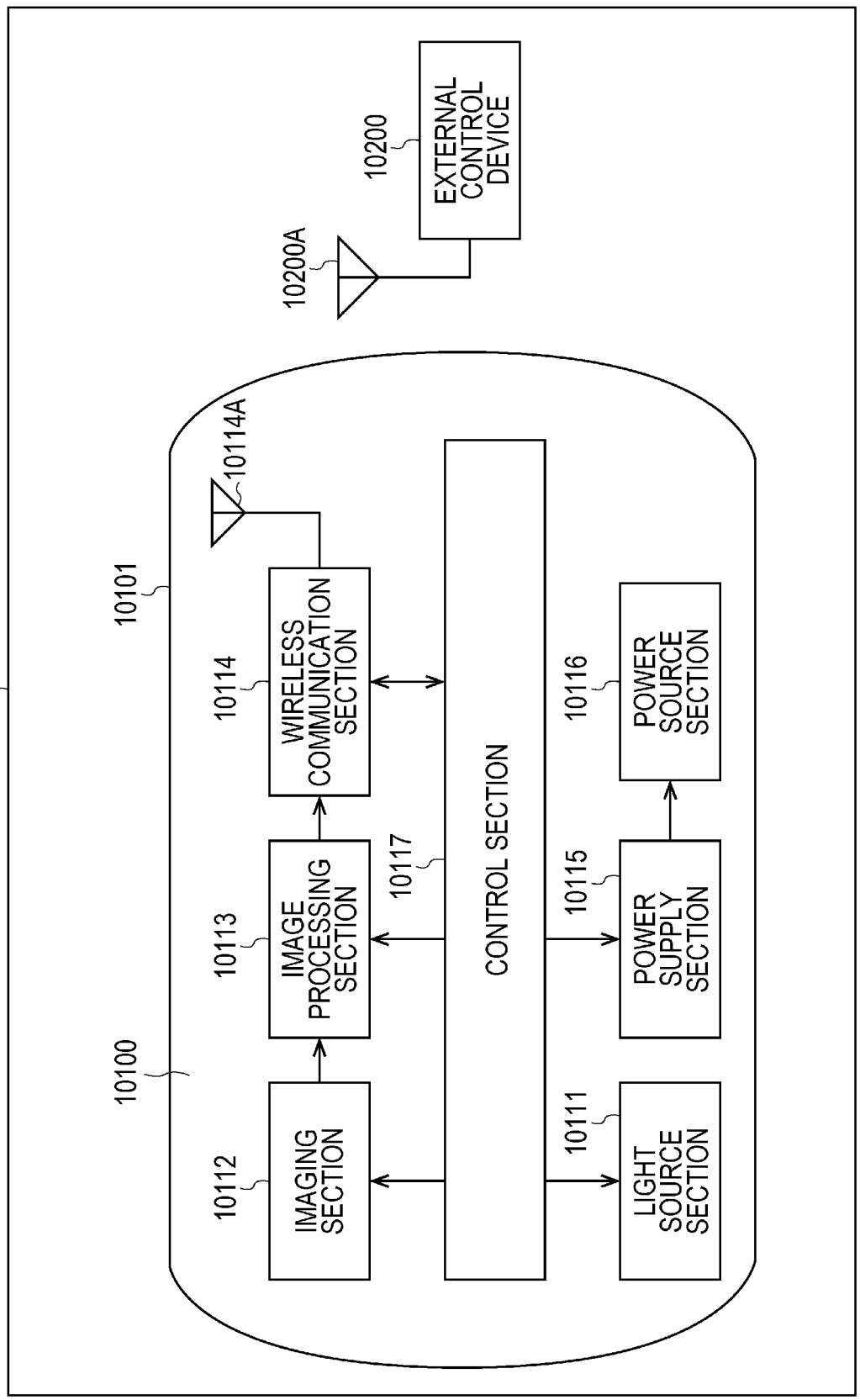
FIG. 19 is a block diagram illustrating an example of schematic configuration of an in-vivo information acquisition system.

FIG. 19 is a block diagram illustrating an example of a schematic configuration of a patient in-vivo information acquisition system using a capsule endoscope to which the technology according to the present disclosure (present technology) can be applied.

An in-vivo information acquisition system 10001 includes a capsule endoscope 10100 and an external control device 10200.

The capsule endoscope 10100 is swallowed by a patient at the time of examination. The capsule endoscope 10100 has an imaging function and a wireless communication function and, while moving inside an organ such as a stomach and an intestine by peristaltic movement or the like until it is naturally excreted from the patient, sequentially captures images inside the organ (hereinafter also referred to as in-vivo images) at predetermined intervals, and sequentially transmits information regarding the in-vivo images wirelessly to the external control device 10200 outside the body.

The external control device 10200 centrally controls the operation of the in-vivo information acquisition system 10001. Furthermore, the external control device 10200 receives information regarding the in-vivo images transmitted from the capsule endoscope 10100, and generates image data for displaying the in-vivo images on a display device (not illustrated) on the basis of the received information regarding the in-vivo images.

In this way, with the in-vivo information acquisition system 10001, in-vivo images indicating the patient's internal conditions can be obtained continually from the time the capsule endoscope 10100 is swallowed to the time the capsule endoscope 10100 is excreted.

The configurations and functions of the capsule endoscope 10100 and the external control device 10200 will be described in further detail.

The capsule endoscope 10100 includes a capsule-shaped housing 10101, and includes a light source section 10111, an imaging section 10112, an image processing section 10113, a wireless communication section 10114, a power supply section 10115, a power source section 10116, and a control section 10117 which are housed in the capsule-shaped housing 10101.

The light source section 10111 includes a light source such as a light emitting diode (LED) or the like, for example, and irradiates an imaging field of view of the imaging section 10112 with light.

The imaging section 10112 includes an optical system including an imaging element and a plurality of lenses provided on a preceding stage of the imaging element. Reflected light (hereinafter referred to as observation light) of the light applied to body tissue to be observed is condensed by the optical system and is incident on the imaging element. In the imaging section 10112, in the imaging element, the observation light incident thereon is photoelectrically converted, and an image signal corresponding to the observation light is generated. The image signal generated by the imaging section 10112 is provided to the image processing section 10113.

The image processing section 10113 includes a processor such as a central processing unit (CPU), a graphics processing unit (GPU), or the like, and performs various kinds of signal processing on the image signal generated by the imaging section 10112. The image processing section 10113 provides the image signal that has been subjected to signal processing to the wireless communication section 10114 as RAW data.

The wireless communication section 10114 performs predetermined processing such as modulation processing or the like on the image signal that has been subjected to the signal processing by the image processing section 10113, and transmits the image signal to the external control device 10200 via an antenna 10114A. Furthermore, the wireless communication section 10114 receives a control signal regarding drive control of the capsule endoscope 10100 from the external control device 10200 via the antenna 10114A. The wireless communication section 10114 provides the control signal received from the external control device 10200 to the control section 10117.

The power supply section 10115 includes an antenna coil for power reception, a power regeneration circuit for regenerating power from current generated in the antenna coil, a booster circuit and the like. In the power supply section 10115, the principle of what is called contactless charging is used to generate power.

The power source section 10116 includes a secondary battery, and accumulates the power generated by the power supply section 10115. Although arrows or the like indicating the destination to which power from the power source section 10116 is supplied are not illustrated in FIG. 19 for preventing the illustration from being complex, power accumulated in the power source section 10116 is supplied to the light source section 10111, the imaging section 10112, the image processing section 10113, the wireless communication section 10114, and the control section 10117, and may be used to drive these sections.

The control section 10117 includes a processor such as a CPU, and appropriately controls drives of the light source section 10111, the imaging section 10112, the image processing section 10113, the wireless communication section 10114, and the power supply section 10115 in accordance with a control signal transmitted from the external control device 10200.

The external control device 10200 includes a processor such as a CPU, a GPU, or the like, or a microcomputer or a control board or the like on which a processor and a storage element such as a memory are mounted in a mixed manner. The external control device 10200 controls the operation of the capsule endoscope 10100 by transmitting the control signal to the control section 10117 of the capsule endoscope 10100 via an antenna 10200A. In the capsule endoscope 10100, for example, an irradiation condition of the light to the observation target in the light source section 10111 might be changed by the control signal from the external control device 10200. Furthermore, an imaging condition (for example, a frame rate, an exposure value and the like in the imaging section 10112) might be changed by the control signal from the external control device 10200. Furthermore, the contents of processing in the image processing section 10113 and conditions for transmitting the image signal by the wireless communication section 10114 (for example, transmission interval, number of transmitted images, and the like) may be changed by the control signal from the external control device 10200.

Furthermore, the external control device 10200 performs various types of image processing on the image signal transmitted from the capsule endoscope 10100, and generates image data for displaying a captured in-vivo image on a display device. As the image processing, for example, various signal processing such as development processing (demosaic processing), image quality enhancement processing (band enhancement processing, super-resolution processing, noise reduction (NR) processing, and/or camera shake correction processing, and the like), and/or enlargement processing (electronic zoom processing) and the like can be performed. The external control device 10200 controls driving of the display device to display the in-vivo image captured on the basis of the generated image data. Alternatively, the external control device 10200 may also cause a recording device (not illustrated) to record the generated image data, or cause a printing device (not illustrated) to make a printout of the generated image data.

An example of the in-vivo information acquisition system to which the technology according to the present disclosure can be applied has been described above. The technology according to the present disclosure can be applied to, for example, the imaging section 10112 among the above-described configurations. As a result, the dynamic range of the imaging section 10112 is expanded.

Application Example to Endoscopic Surgical System

The technology of the present disclosure (present technology) can be applied to various products. For example, the technology according to the present disclosure may be applied to an endoscopic surgical system.

Figure 20:
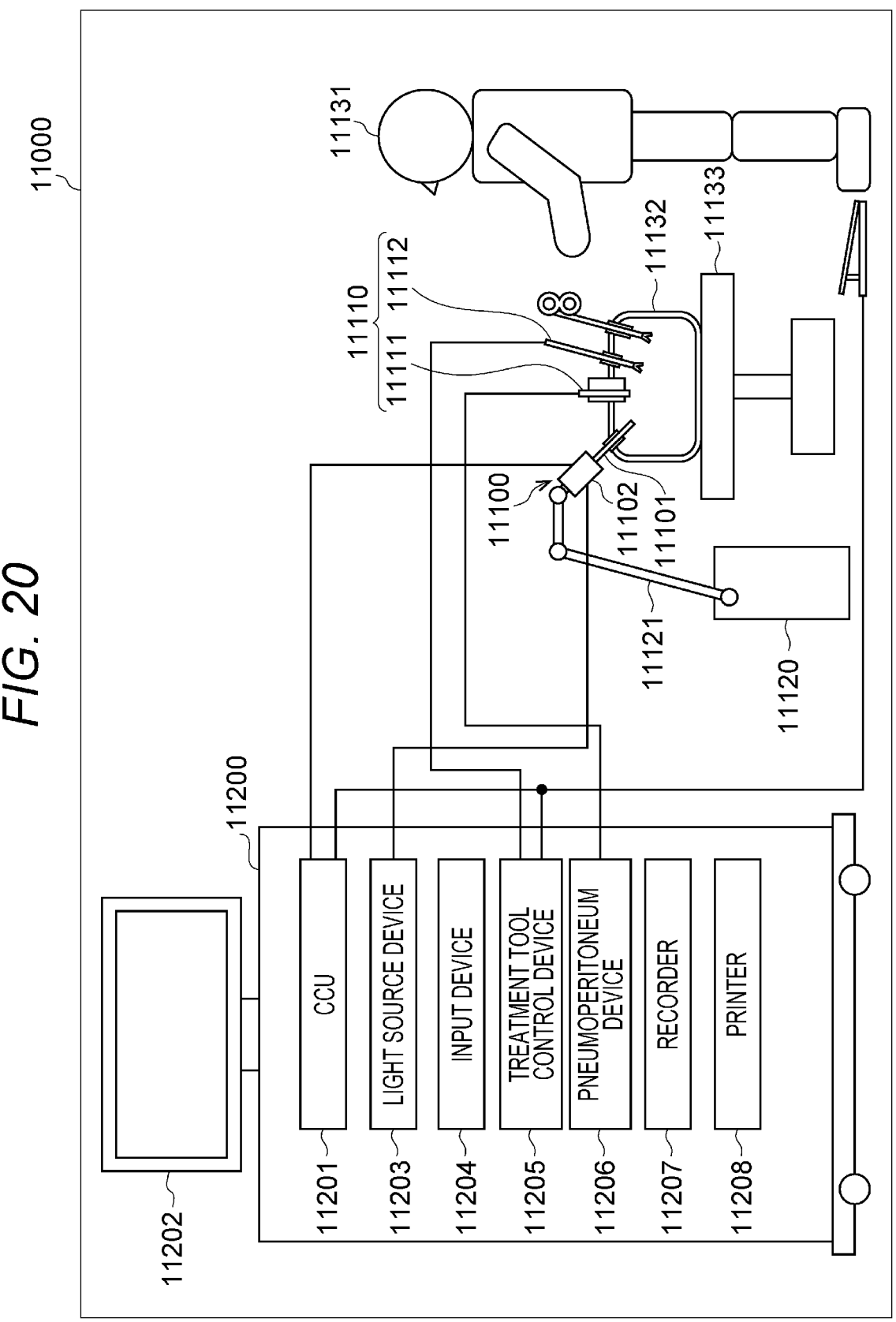
FIG. 20 is a diagram illustrating an example of a schematic configuration of an endoscopic surgical system.

FIG. 20 is a diagram illustrating an example of a schematic configuration of an endoscopic surgical system to which the technology according to the present disclosure (present technology) can be applied.

FIG. 20 illustrates a state in which an operator (doctor) 11131 is performing surgery on a patient 11132 on a patient bed 11133 using an endoscopic surgical system 11000. As illustrated, the endoscopic surgical system 11000 includes an endoscope 11100, other surgical tools 11110 such as a pneumoperitoneum tube 11111 and an energy device 11112, a supporting arm apparatus 11120 which supports the endoscope 11100 thereon, and a cart 11200 on which various apparatus for endoscopic surgery are mounted.

The endoscope 11100 includes a lens barrel 11101 having a region of a predetermined length from a distal end thereof to be inserted into a body cavity of the patient 11132, and a camera head 11102 connected to a proximal end of the lens barrel 11101. In the illustrated example, the endoscope 11100 configured as a so-called rigid scope having the rigid lens barrel 11101 is illustrated, but the endoscope 11100 may be configured as a so-called flexible scope having a flexible lens barrel.

The lens barrel 11101 has, at a distal end thereof, an opening in which an objective lens is fitted. A light source device 11203 is connected to the endoscope 11100 such that light generated by the light source device 11203 is introduced to a distal end of the lens barrel 11101 by a light guide extending in the inside of the lens barrel 11101 and is irradiated toward an observation target in a body cavity of the patient 11132 through the objective lens. It is to be noted that the endoscope 11100 may be a forward-viewing endoscope or may be an oblique-viewing endoscope or a side-viewing endoscope.

An optical system and an imaging element are provided in the inside of the camera head 11102 such that reflected light (observation light) from the observation target is condensed on the imaging element by the optical system. The observation light is photoelectrically converted by the imaging element to generate an electric signal corresponding to the observation light, namely, an image signal corresponding to an observation image. The image signal is transmitted as RAW data to a camera control unit (CCU) 11201.

The CCU 11201 includes a central processing unit (CPU), a graphics processing unit (GPU), or the like, and comprehensively controls operation of the endoscope 11100 and a display device 11202. Moreover, the CCU 11201 receives an image signal from the camera head 11102, and applies, on the image signal, various types of image processing for displaying an image based on the image signal, for example, development processing (demosaic processing) and the like.

The display device 11202 displays thereon an image based on an image signal, for which the image processing has been performed by the CCU 11201, under the control of the CCU 11201.

The light source device 11203 includes a light source such as, for example, a light emitting diode (LED) and supplies irradiation light upon imaging of a surgical site or the like to the endoscope 11100.

An input device 11204 is an input interface for the endoscopic surgical system 11000. A user can input various types of information and input instructions to the endoscopic surgical system 11000 via the input device 11204. For example, the user inputs an instruction or the like for changing imaging conditions (a type of irradiation light, a magnification, a focal length, and the like) by the endoscope 11100.

A treatment tool control device 11205 controls driving of the energy device 11112 for cautery or incision of a tissue, sealing of a blood vessel or the like. A pneumoperitoneum device 11206 feeds gas into a body cavity of the patient 11132 through the pneumoperitoneum tube 11111 to inflate the body cavity in order to secure the field of view of the endoscope 11100 and secure the working space for the operator. A recorder 11207 is an apparatus capable of recording various kinds of information relating to surgery. A printer 11208 is an apparatus capable of printing various kinds of information relating to surgery in various forms such as a text, an image, a graph, or the like.

Note that the light source device 11203 that supplies the endoscope 11100 with the irradiation light at the time of imaging the surgical site can include, for example, an LED, a laser light source, or a white light source including a combination thereof. In a case where a white light source includes a combination of red, green, and blue (RGB) laser light sources, since the output intensity and the output timing can be controlled with a high degree of accuracy for each color (each wavelength), adjustment of the white balance of a captured image can be performed by the light source device 11203. Furthermore, in this case, by irradiating the observation target with the laser light from each of the R, G, and B laser light sources in time division manner and controlling drive of the imaging element of the camera head 11102 in synchronization with irradiation timing, it is possible to capture images corresponding to R, G, and B in time division manner. According to this method, a color image can be obtained even if color filters are not provided for the imaging element.

Furthermore, driving of the light source device 11203 may be controlled so as to change the intensity of output light at every predetermined time interval. By controlling driving of the imaging element of the camera head 11102 in synchronization with the timing of the change of the intensity of light to acquire images time-divisionally and synthesizing the images, an image of a high dynamic range free from underexposed blocked up shadows and overexposed highlights can be created.

Furthermore, the light source device 11203 may be configured to be able to supply light having a predetermined wavelength band corresponding to special light observation. In special light observation, for example, by utilizing the wavelength dependency of absorption of light in a body tissue to irradiate light of a narrow band in comparison with irradiation light upon ordinary observation (namely, white light), narrow band observation (narrow band imaging) of imaging a predetermined tissue such as a blood vessel of a superficial portion of the mucous membrane or the like in a high contrast is performed. Alternatively, in special light observation, fluorescent observation for obtaining an image from fluorescent light generated by irradiation of excitation light may be performed. In fluorescent observation, it is possible, for example, to perform observation of fluorescent light from a body tissue by irradiating excitation light on the body tissue (autofluorescence observation) or to obtain a fluorescent light image by locally injecting a reagent such as indocyanine green (ICG) into a body tissue and irradiating excitation light corresponding to a fluorescent light wavelength of the reagent upon the body tissue. The light source device 11203 can be configured to supply such narrow-band light and/or excitation light suitable for special light observation as described above.

Figure 21:
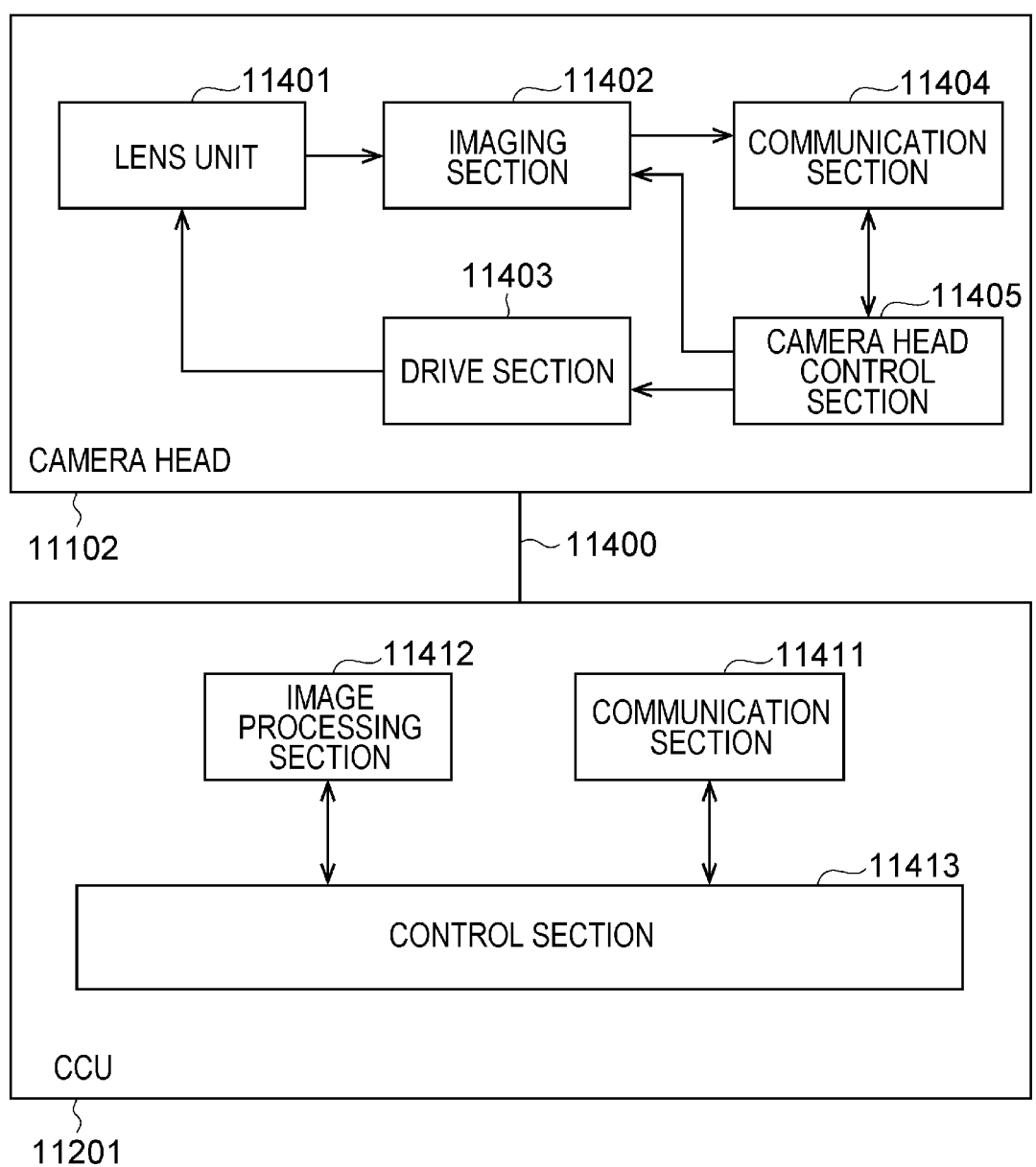
FIG. 21 is a block diagram depicting an example of schematic configuration of a vehicle control system.

FIG. 21 is a block diagram illustrating an example of a functional configuration of the camera head 11102 and the CCU 11201 illustrated in FIG. 20.

The camera head 11102 includes a lens unit 11401, an imaging section 11402, a drive section 11403, a communication section 11404, and a camera head control section 11405. The CCU 11201 includes a communication section 11411, an image processing section 11412, and a control section 11413. The camera head 11102 and the CCU 11201 are communicatively connected to each other by a transmission cable 11400.

The lens unit 11401 is an optical system provided at a connection to the lens barrel 11101. The observation light taken in from the distal end of the lens barrel 11101 is guided to the camera head 11102 and is incident on the lens unit 11401. The lens unit 11401 includes a combination of a plurality of lenses including a zoom lens and a focusing lens.

The number of the imaging elements included in the imaging section 11402 may be one (a so-called single plate type) or plural (a so-called multi-plate type). In a case where the imaging section 11402 is of the multiple plate type, image signals corresponding to R, G, and B may be generated by the respective imaging elements, and a color image may be obtained by combining the generated image signals, for example. The imaging section 11402 may also be configured so as to have a pair of imaging elements for acquiring respective image signals for the right eye and the left eye ready for three dimensional (3D) display. By the 3D display, the operator 11131 may grasp a depth of the living tissue in the surgical site more accurately. Note that, in a case where the imaging section 11402 is of the multiple-plate type, a plurality of systems of lens units 11401 may be provided so as to correspond to the respective imaging elements.

Furthermore, the imaging section 11402 may not necessarily be provided in the camera head 11102. For example, the imaging section 11402 may be provided immediately behind the objective lens in the inside of the lens barrel 11101.

The drive section 11403 includes an actuator and moves the zoom lens and the focusing lens of the lens unit 11401 by a predetermined distance along an optical axis under the control of the camera head control section 11405. As a result, the magnification and the focal point of a captured image by the imaging section 11402 can be adjusted suitably.

The communication section 11404 includes a communication device for transmitting and receiving various kinds of information to and from the CCU 11201. The communication section 11404 transmits an image signal acquired from the imaging section 11402 as RAW data to the CCU 11201 through the transmission cable 11400.

In addition, the communication section 11404 receives a control signal for controlling driving of the camera head 11102 from the CCU 11201 and supplies the control signal to the camera head control section 11405. The control signal includes, for example, information regarding an imaging condition such as information specifying a frame rate of a captured image, information specifying an exposure value at the time of imaging, and/or information specifying the magnification and focal point of the captured image.

Note that the above imaging conditions such as the frame rate, exposure value, magnification, and focus described above may be appropriately specified by the user, or may be automatically set by the control section 11413 of the CCU 11201 on the basis of the acquired image signal. In the latter case, an auto exposure (AE) function, an auto focus (AF) function and an auto white balance (AWB) function are incorporated in the endoscope 11100.

The camera head control section 11405 controls driving of the camera head 11102 on the basis of a control signal from the CCU 11201 received through the communication section 11404.

The communication section 11411 includes a communication device for transmitting and receiving various types of information to and from the camera head 11102. The communication section 11411 receives an image signal transmitted thereto from the camera head 11102 through the transmission cable 11400.

Furthermore, the communication section 11411 transmits, to the camera head 11102, a control signal for controlling driving of the camera head 11102. The image signal and the control signal can be transmitted by electrical communication, optical communication, or the like.

The image processing section 11412 performs various types of image processing on the image signal being the RAW data transmitted from the camera head 11102.

The control section 11413 performs various control related to imaging of the surgical site or the like by the endoscope 11100 and display of a captured image obtained by the imaging of the surgical site or the like. For example, the control section 11413 creates a control signal for controlling driving of the camera head 11102.

Furthermore, the control section 11413 controls, on the basis of an image signal for which image processes have been performed by the image processing section 11412, the display device 11202 to display a picked up image in which the surgical site or the like is imaged. Thereupon, the control section 11413 may recognize various objects in the captured image using various image recognition technologies. For example, the control section 11413 can recognize a surgical tool such as forceps, a particular living body region, bleeding, mist when the energy device 11112 is used and the like by detecting the shape, color and the like of edges of objects included in a captured image. The control section 11413 may cause, when it controls the display device 11202 to display a picked up image, various kinds of surgery supporting information to be displayed in an overlapping manner with an image of the surgical site using a result of the recognition. The surgery support information is superimposed to be displayed, and presented to the operator 11131, so that it becomes possible to reduce the burden on the operator 11131 and enable the operator 11131 to reliably proceed with surgery.

The transmission cable 11400 which connects the camera head 11102 and the CCU 11201 to each other is an electric signal cable ready for communication of an electric signal, an optical fiber ready for optical communication or a composite cable ready for both of electrical and optical communications.

Here, in the illustrated example, the communication is performed by wire using the transmission cable 11400, but the communication between the camera head 11102 and the CCU 11201 may be performed wirelessly.

An example of the endoscopic surgical system to which the technology according to the present disclosure can be applied has been described above. The technology according to the present disclosure may be applied to the imaging section 11402 among the configurations described above. As a result, the dynamic range of the imaging section 11402 is expanded.

Note that, here, the endoscopic surgical system has been described as an example, but the technology according to the present disclosure may be applied to, for example, a microscopic surgical system or the like.

Application Example to Mobile Body

The technology according to the present disclosure may also be achieved as a device mounted on any type of mobile body such as an automobile, an electric vehicle, a hybrid electric vehicle, a motorcycle, a bicycle, a personal mobility, an airplane, a drone, a boat, a robot, and the like.

Figure 22:
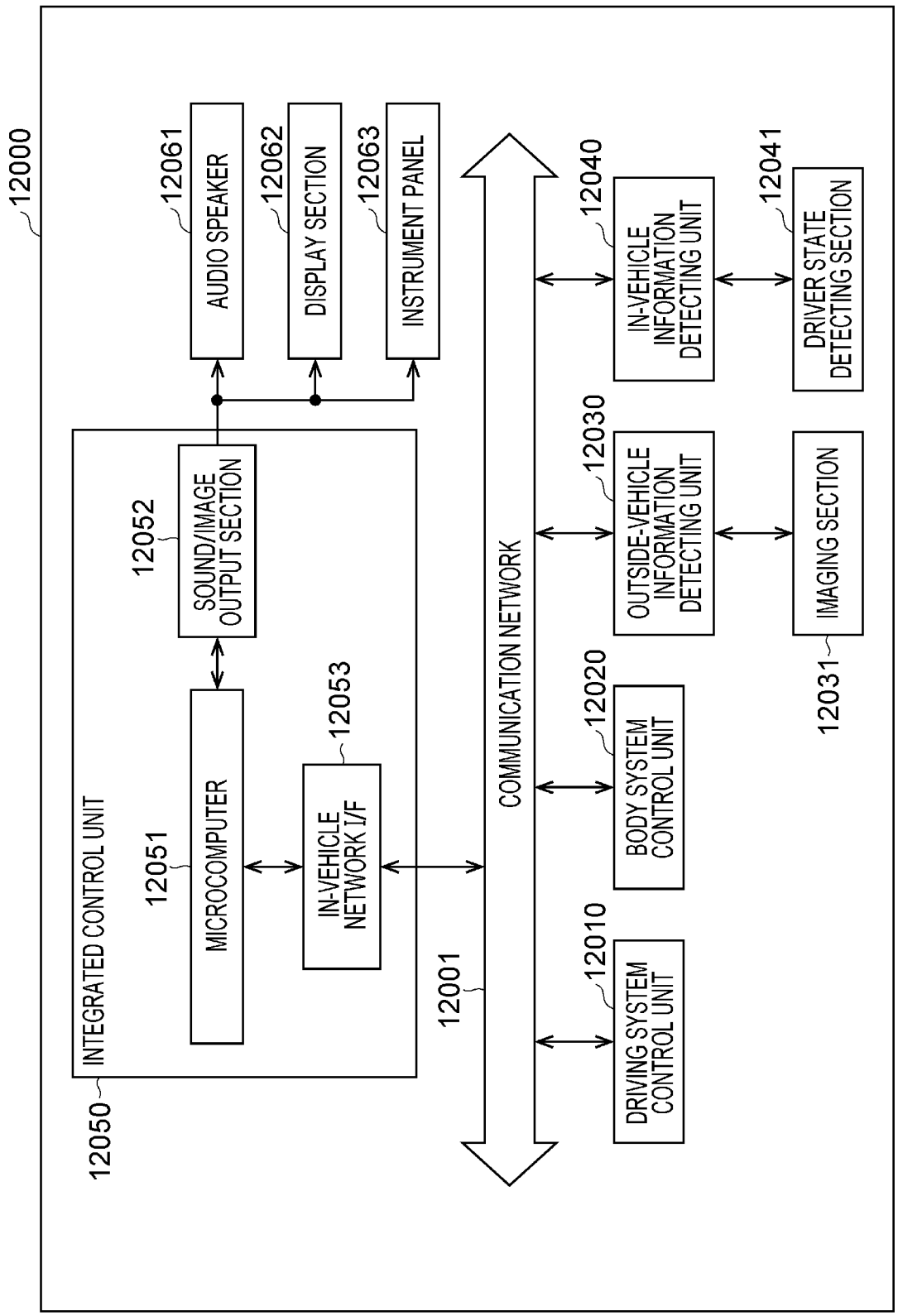
FIG. 22 is a block diagram illustrating an example of a schematic configuration of a vehicle control system.

FIG. 22 is a block diagram depicting an example of schematic configuration of a vehicle control system as an example of a mobile body control system to which the technology according to an embodiment of the present disclosure can be applied.

The vehicle control system 12000 includes a plurality of electronic control units connected to each other via a communication network 12001. In the example depicted in FIG. 22, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehicle-mounted network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automated driving, which makes the vehicle to travel automatedly without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12020 on the basis of the information about the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound and an image to an output device capable of visually or auditorily notifying information to an occupant of the vehicle or the outside of the vehicle. In the example of FIG. 11, an audio speaker 12061, a display section 12062, and an instrument panel 12063 are illustrated as the output device. The display section 12062 may, for example, include at least one of an on-board display and a head-up display.

Figure 23:
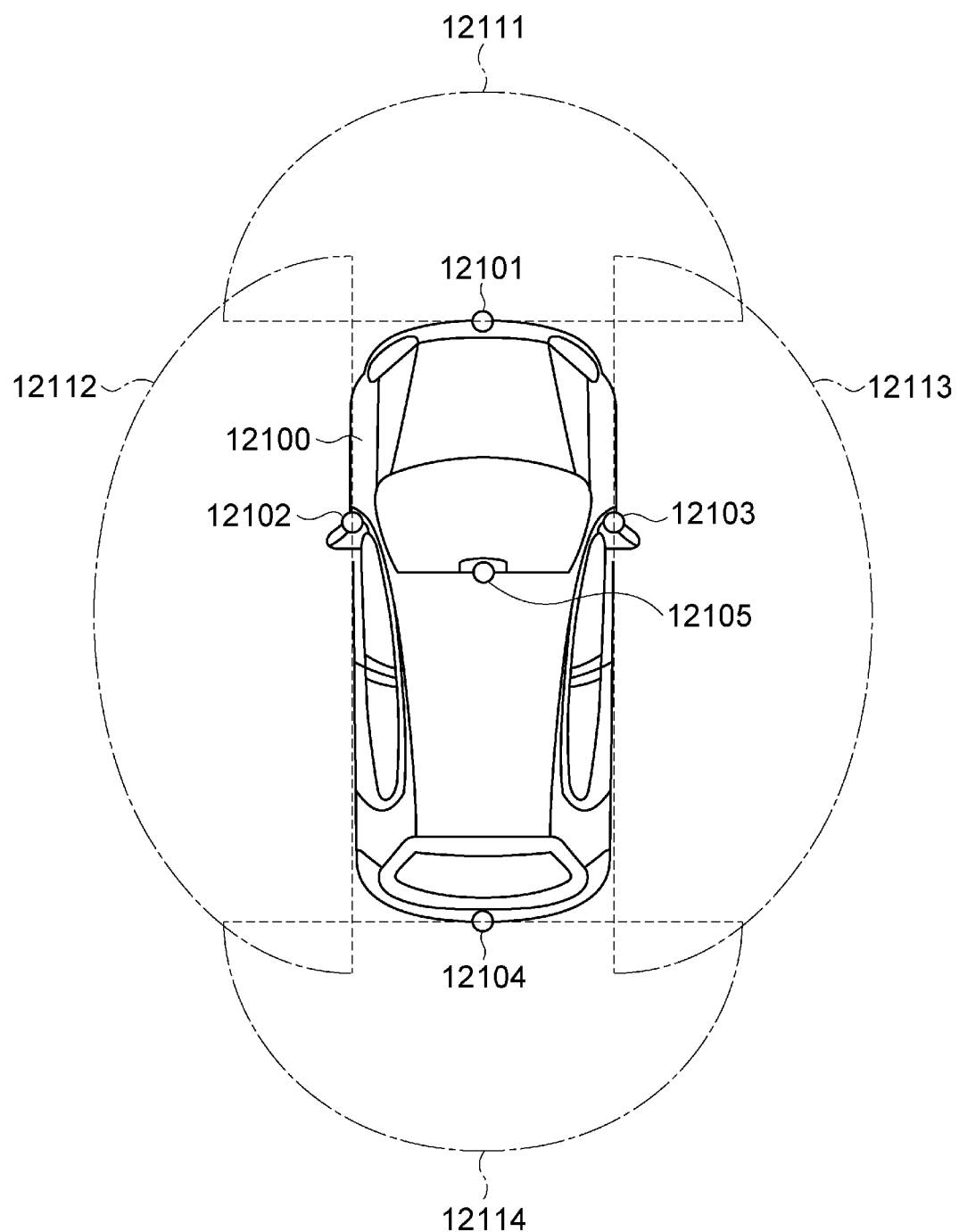
FIG. 23 is a diagram of assistance in explaining an example of installation positions of an outside-vehicle information detecting section and an imaging section.

FIG. 23 is a diagram depicting an example of the installation position of the imaging section 12031.

In FIG. 23, the imaging section 12031 includes imaging sections 12101, 12102, 12103, 12104, and 12105.

The imaging sections 12101, 12102, 12103, 12104, and 12105 are, for example, disposed at positions such as on a front nose, sideview mirrors, a rear bumper, and a back door of the vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the sideview mirrors obtain mainly an image of the sides of the vehicle 12100. The imaging section 12104 provided to the rear bumper or the back door obtains mainly an image of the rear of the vehicle 12100. The imaging section 12105 provided to the upper portion of the windshield within the interior of the vehicle is used mainly to detect a preceding vehicle, a pedestrian, an obstacle, a signal, a traffic sign, a lane, or the like.

Incidentally, FIG. 23 depicts an example of photographing ranges of the imaging sections 12101 to 12104. An imaging range 12111 represents the imaging range of the imaging section 12101 provided to the front nose. Imaging ranges 1211212113 respectively represent the imaging ranges of the imaging sections 12102 and 12103 provided to the sideview mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automated driving that makes the vehicle travel automatedly without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

An example of the vehicle control system to which the technology according to the present disclosure can be applied has been described above. The technology according to the present disclosure can be applied to the imaging section 12031 and the like in the configuration described above, for example. Specifically, the imaging device 1 can be applied to the imaging section 12031. By applying the technology according to the present disclosure, the dynamic range of the imaging section 12031 is expanded.

Note that the present technology can have configurations as follows.

(1) An imaging device including:
a photoelectric conversion element provided in each of a plurality of pixels;
a first charge accumulation section connected to the photoelectric conversion element;
a second charge accumulation section connected in parallel with the first charge accumulation section;
a reset transistor that resets a potential of the second charge accumulation section;
a transfer transistor disposed between the first charge accumulation section and the second charge accumulation section;
a third charge accumulation section connected in parallel with the first charge accumulation section; and
a first changeover switch that is disposed between the first charge accumulation section and the third charge accumulation section and switches whether or not to connect the third charge accumulation section to the photoelectric conversion element.

(2) The imaging device according to (1), in which the first changeover switch switches whether or not to connect the third charge accumulation section to the photoelectric conversion element according to a light amount of light incident on the photoelectric conversion element.

(3) The imaging device according to (2), in which the first changeover switch is in an off state in a case where the light amount is smaller than a reference value, and in an on state in a case where the light amount is larger than the reference value.

(4) The imaging device according to any one of (1) to (3), further including:
a second changeover switch connected to each of the reset transistor and the second charge accumulation section; and
a fourth charge accumulation section disposed between the reset transistor and the second changeover switch or connected in parallel with the second charge accumulation section via the second changeover switch.

(5) The imaging device according to (4), in which the second changeover switch switches whether or not to connect the fourth charge accumulation section to the second charge accumulation section in synchronization with the first changeover switch.

(6) The imaging device according to (4) or (5), in which an addition value of capacitances of the first charge accumulation section and the third charge accumulation section is equal to an addition value of capacitances of the second charge accumulation section and the fourth charge accumulation section.

(7) The imaging device according to any one of (4) to (6), in which the reset transistor, the transfer transistor, the first changeover switch, and the second changeover switch are P-channel MOS transistors.

(8) The imaging device according to any one of (1) to (7), further including
a selection transistor that switches whether or not to output a pixel signal corresponding to an amount of charge accumulated in the second charge accumulation section,
in which the selection transistor is turned on again after the first changeover switch is maintained in an off state and the first changeover switch is subsequently switched from the off state to an on state.

(9) The imaging device according to any one of (1) to (8), in which a capacitance of the third charge accumulation section is larger than a capacitance of the first charge accumulation section.

(10) The imaging device according to any one of (1) to (9), in which, among the plurality of pixels, a pixel in which the third charge accumulation section is connected to the photoelectric conversion element by the first changeover switch and a pixel in which the third charge accumulation section is not connected to the photoelectric conversion element by the first changeover switch are mixed.

(11) The imaging device according to any one of (1) to (10), further including an overflow gate transistor that discharges charge accumulated in the third charge accumulation section.

(12) The imaging device according to any one of (1) to (10), in which the reset transistor, the transfer transistor, and the first changeover switch are P-channel MOS transistors.

(13) The imaging device according to any one of (1) to (10), further including a third changeover switch that switches whether or not to connect the second charge accumulation sections respectively provided in adjacent pixels adjacent to each other among the plurality of pixels.

(14) The imaging device according to (13), in which, among the plurality of pixels, the third changeover switch is always in an on state in a case where the adjacent pixels are added, and the third changeover switch is always in an off state in a case where the adjacent pixels are not added.

REFERENCE SIGNS LIST

1 Imaging device
10 Photoelectric conversion element
21 First charge accumulation section
22 Transfer transistor
23 Second charge accumulation section
24 Reset transistor
26 Selection transistor
27 Changeover switch
28 Third charge accumulation section
29 Overflow gate transistor 30 Changeover switch
31 Changeover switch
32 Fourth charge accumulation section

The invention claimed is:

1. An imaging device, comprising:
a photoelectric conversion element provided in each of a plurality of pixels;
a first charge accumulation section connected to the photoelectric conversion element;
a second charge accumulation section connected in parallel with the first charge accumulation section;
a reset transistor configured to reset a potential of the second charge accumulation section;
a transfer transistor disposed between the first charge accumulation section and the second charge accumulation section;
a third charge accumulation section connected in parallel with the first charge accumulation section; and
a first changeover switch that is disposed between the first charge accumulation section and the third charge accumulation section and switches whether or not to connect the third charge accumulation section to the photoelectric conversion element.

2. The imaging device according to claim 1, wherein the first changeover switch is configured to switch whether or not to connect the third charge accumulation section to the photoelectric conversion element based on a light amount of light incident on the photoelectric conversion element.

3. The imaging device according to claim 2, wherein the first changeover switch is in an off state based on the light amount is smaller than a reference value, and in an on state based on the light amount is larger than the reference value.

4. The imaging device according to claim 1, further comprising:
a second changeover switch connected to each of the reset transistor and the second charge accumulation section; and
a fourth charge accumulation section disposed between the reset transistor and the second changeover switch or connected in parallel with the second charge accumulation section via the second changeover switch.

5. The imaging device according to claim 4, wherein the second changeover switch is configured to switch whether or not to connect the fourth charge accumulation section to the second charge accumulation section in synchronization with the first changeover switch.

6. The imaging device according to claim 4, wherein an addition value of capacitances of the first charge accumulation section and the third charge accumulation section is equal to an addition value of capacitances of the second charge accumulation section and the fourth charge accumulation section.

7. The imaging device according to claim 4, wherein the reset transistor, the transfer transistor, the first changeover switch, and the second changeover switch are P-channel MOS transistors.

8. The imaging device according to claim 1, further comprising:
a selection transistor configured to switch whether or not to output a pixel signal corresponding to an amount of charge accumulated in the second charge accumulation section, wherein
the selection transistor is turned on again after the first changeover switch is maintained in an off state and the first changeover switch is subsequently switched from the off state to an on state.

9. The imaging device according to claim 1, wherein a capacitance of the third charge accumulation section is larger than a capacitance of the first charge accumulation section.

10. The imaging device according to claim 1, wherein, among the plurality of pixels, a pixel in which the third charge accumulation section is connected to the photoelectric conversion element by the first changeover switch and a pixel in which the third charge accumulation section is not connected to the photoelectric conversion element by the first changeover switch are mixed.

11. The imaging device according to claim 1, further comprising an overflow gate transistor configured to discharge charge accumulated in the third charge accumulation section.

12. The imaging device according to claim 1, wherein the reset transistor, the transfer transistor, and the first changeover switch are P-channel MOS transistors.

13. The imaging device according to claim 1, further comprising a third changeover switch is configured to switch whether or not to connect the second charge accumulation sections respectively provided in adjacent pixels adjacent to each other among the plurality of pixels.

14. The imaging device according to claim 13, wherein, among the plurality of pixels, the third changeover switch is always in an on state based on the adjacent pixels are added, and the third changeover switch is always in an off state based on the adjacent pixels are not added.

* * * * *